(12) United States Patent
Song et al.

(10) Patent No.: US 11,941,215 B2
(45) Date of Patent: *Mar. 26, 2024

(54) ELECTRONIC DEVICE COMPRISING TOUCH LAYER HAVING OPENING

(71) Applicant: Samsung Electronics Co., Ltd., Suwon-si (KR)

(72) Inventors: Aram Song, Suwon-si (KR); Sangheon Park, Suwon-si (KR); Hoondo Heo, Suwon-si (KR); Minuk Kim, Suwon-si (KR); Jongdae Park, Suwon-si (KR); Ilyong Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,190

(22) Filed: Mar. 3, 2023

(65) Prior Publication Data

US 2023/0205384 A1    Jun. 29, 2023

Related U.S. Application Data

(63) Continuation of application No. 17/859,617, filed on Jul. 7, 2022, now Pat. No. 11,604,553, which is a
(Continued)

(30) Foreign Application Priority Data

Oct. 16, 2018    (KR) .................. 10-2018-0123051

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0443* (2019.05);
(Continued)

(58) Field of Classification Search
CPC .... G06F 3/0446; G06F 3/0443; G06F 3/0412; G06F 2203/04111; G06F 2201/04112;
(Continued)

(56) References Cited

U.S. PATENT DOCUMENTS 8,619,058 B2    12/2013  To et al.
10,025,443 B2    7/2018  Ando
(Continued)

FOREIGN PATENT DOCUMENTS

CN    107230434 A      10/2017
CN    109976573 A  *   7/2019  ........... G06F 1/1686
(Continued)

OTHER PUBLICATIONS

European Search Report dated May 11, 2022, issued in European Patent Application No. 19873404.8-1224.
(Continued)

*Primary Examiner* — Ricardo Osorio
(74) *Attorney, Agent, or Firm* — Jefferson IP Law, LLP

(57) ABSTRACT

According to various embodiments of the present invention, an electronic device may comprise a touch layer in which a sensor may be disposed below a designated area, wherein the touch layer comprises: a first touch line including a first touch electrode and a second touch electrode arranged in a first direction in the designated area; a second touch line including a third touch electrode and a fourth touch electrode arranged in a second direction while crossing the first touch line in the designated area; a first opening formed in the area where the first touch line and the second touch line cross each other; and a first connection wiring disposed in the peripheral portion of the first opening and connecting the first touch electrode and the second touch electrode to each other. Various other embodiments are also possible.

11 Claims, 18 Drawing Sheets

Related U.S. Application Data continuation of application No. 17/284,943, filed as application No. PCT/KR2019/013304 on Oct. 10, 2019, now Pat. No. 11,442,587.

(52) U.S. Cl.
CPC .............. *G06F 2203/04111* (2013.01); *G06F 2203/04112* (2013.01)

(58) Field of Classification Search
CPC . G06F 3/04164; G06F 3/0448; G06F 3/04186
See application file for complete search history.

(56) References Cited

U.S. PATENT DOCUMENTS

| | | |
|---|---|---|
| 10,171,636 B2 | 1/2019 | Yeo et al. |
| 10,191,577 B2 | 1/2019 | Choi et al. |
| 10,230,069 B2 | 3/2019 | Choi et al. |
| 10,855,822 B2 | 12/2020 | Cheng |
| 10,860,057 B2 | 12/2020 | Wu et al. |
| 10,884,305 B2 | 1/2021 | Yoshida |
| 10,930,885 B2 | 2/2021 | Kim et al. |
| 11,009,976 B2 | 5/2021 | Yang et al. |
| 11,057,554 B2 | 7/2021 | Nakamura et al. |
| 11,068,089 B1 | 7/2021 | Kim et al. |
| 11,442,587 B2 * | 9/2022 | Song ..................... G06F 3/0443 |
| 11,604,553 B2 * | 3/2023 | Song ..................... G06F 3/0443 |
| 2007/0133983 A1 | 6/2007 | Traff |
| 2009/0051636 A1 | 2/2009 | Natori |
| 2011/0247884 A1 | 10/2011 | Kim et al. |
| 2012/0255850 A1 | 10/2012 | Shimizu |
| 2013/0094126 A1 | 4/2013 | Rappoport et al. |
| 2013/0313672 A1 | 11/2013 | Min |
| 2015/0324027 A1 | 11/2015 | Heo et al. |
| 2016/0011633 A1 | 1/2016 | Watanabe et al. |
| 2016/0070395 A1 | 3/2016 | Hung et al. |
| 2016/0202516 A1 | 7/2016 | Watanabe et al. |
| 2017/0031323 A1 | 2/2017 | Kim et al. |
| 2017/0068382 A1 | 3/2017 | Choi et al. |
| 2017/0154566 A1 | 6/2017 | Ryoo et al. |
| 2017/0235398 A1 | 8/2017 | Choi et al. |
| 2017/0269749 A1 | 9/2017 | Bok et al. |
| 2017/0287992 A1 | 10/2017 | Kwak et al. |
| 2017/0289324 A1 | 10/2017 | Yeo et al. |
| 2017/0293380 A1 | 10/2017 | Chauveau et al. |
| 2017/0307933 A1 | 10/2017 | Chen et al. |
| 2018/0039358 A1 | 2/2018 | Xie et al. |
| 2018/0069060 A1 | 3/2018 | Rappoport et al. |
| 2018/0129111 A1 | 5/2018 | Wu et al. |
| 2018/0143720 A1 | 5/2018 | Kim et al. |
| 2018/0157362 A1 | 6/2018 | Kim et al. |
| 2019/0214596 A1 | 7/2019 | Park |
| 2019/0286281 A1 | 9/2019 | Aoki et al. |
| 2020/0381486 A1 | 12/2020 | Jeong et al. |
| 2021/0141481 A1 | 5/2021 | Jeon et al. |

FOREIGN PATENT DOCUMENTS

| | | |
|---|---|---|
| DE | 10 2016 117 976 A1 | 3/2017 |
| EP | 3 745 241 A2 | 12/2020 |
| IN | 107241465 A | 10/2017 |
| KR | 10-2014-0133274 A | 11/2014 |
| KR | 10-2015-0130785 A | 11/2015 |
| KR | 10-2017-0028085 A | 3/2017 |
| KR | 10-2017-0111827 A | 10/2017 |
| KR | 10-2017-0112790 A | 10/2017 |
| KR | 10-2018-0056449 A | 5/2018 |
| KR | 10-2019-0085202 A | 7/2019 |
| KR | 10-2465377 B1 | 11/2022 |
| WO | 2018/110533 A1 | 6/2018 |
| WO | 2018/124343 A1 | 7/2018 |

OTHER PUBLICATIONS

Chinese Office Action with English translation dated Aug. 1, 2023; Chinese Appln .No. 201980067911.7.
Korean Office Action with English translation dated Jul. 20, 2023; Korean Appln .No. 10-2018-0123051.

* cited by examiner

ELECTRONIC DEVICE COMPRISING TOUCH LAYER HAVING OPENING

CROSS-REFERENCE TO RELATED APPLICATION(S)

This application is a continuation application of prior application Ser. No. 17/859,617, filed on Jul. 7, 2022, which is a continuation application of prior application Ser. No. 17/284,943, filed on Apr. 13, 2021, which has issued as U.S. Pat. No. 11,442,587 on Sep. 13, 2022 and is a U.S. National Stage application under 35 U.S.C. § 371 of an International application number PCT/KR2019/013304, filed on Oct. 10, 2019, which is based on and claims priority of a Korean patent application number 10-2018-0123051, filed on Oct. 16, 2018, in the Korean Intellectual Property Office, the disclosure of which is incorporated by reference herein in its entirety.

TECHNICAL FIELD

Various embodiments of the disclosure relates to an electronic device including a touch layer having an opening and configured to support user input around the opening.

BACKGROUND ART

Recently, a full screen display for ensuring the maximum screen in an electronic device has been implemented and developed. For example, research and development have been performed in order to extend a display region (or an active region) of a touchscreen display to a bezel area formed in the outer periphery of the electronic device or the vicinity thereof.

DISCLOSURE OF INVENTION

Technical Problem

A display may include a display panel and a touch layer (or a touch panel). The touch layer may be formed on the display panel. Alternatively, the touch layer may be included in a touch panel formed on or beneath the display panel. At least one sensor may be disposed under the display, and an opening, through which the sensor is visually exposed to the outside, may be formed in the display.

When an opening is formed in the touch layer, a touch line around the opening may be broken and loss of a touch electrode included in the touch line may occur. This may cause the position of user input (e.g. a touch input or a hovering input) to be inaccurately recognized.

Various embodiments of the disclosure may provide an electronic device configured to support the accuracy of user input around an opening.

Solution to Problem

According to various embodiments of the disclosure, an electronic device may include a touch layer in which a sensor is capable of being disposed under a designated region thereof, wherein the touch layer includes: a first touch line, including a first touch electrode and a second touch electrode, arranged in a first direction in the designated region; a second touch line, including a third touch electrode and a fourth touch electrode, arranged in a second direction while crossing the first touch line in the designated region; a first opening formed in a region in which the first touch line crosses the second touch line; and a first connection wire, provided in a surrounding part around the first opening and configured to connect the first touch electrode to the second touch electrode.

According to various embodiments, an electronic device may include a display in which a sensor is capable of being disposed under a designated region thereof, wherein the display may include: a display panel layer having a first opening formed in the designated region and including a non-active region formed in a surrounding part around the first opening; and a touch layer which includes: a first touch line, including a first touch electrode and a second touch electrode, arranged in a first direction in the designated region; a second touch line, including a third electrode and a fourth electrode, arranged in a second direction while crossing the first touch line in the designated region; a second opening formed in a region in which the first touch line crosses the second touch line; and a connection wire configured to connect the first touch electrode to the second touch electrode, wherein the connection wire may be formed in a region around the second opening so as to be aligned with the non-active region.

According to various embodiments, an electronic device may include: a touch layer; and a sensor disposed under a designated region of the touch layer, wherein the touch layer may include: a first touch line arranged in a first direction and including a first touch electrode and a second touch electrode positioned in the designated region; a second touch line arranged in a second direction crossing the first direction and including a third touch electrode and a fourth touch electrode positioned in the designated region; an opening formed in the designated region and parallel to the sensor when seen from above the touch layer; and a compensation pattern formed around the opening so as to compensate the touch sensitivity of at least one among the first touch electrode, the second touch electrode, the third touch electrode, and the fourth touch electrode.

According to various embodiments, an electronic device may include: a touch layer; and a sensor disposed under a designated region of the touch layer, wherein the touch layer may include: a first touch line arranged in a first direction and including a first touch electrode and a second touch electrode positioned in the designated region; a second touch line arranged in a second direction crossing the first direction and including a third touch electrode and a fourth touch electrode positioned in the designated region; and an opening formed in the designated region and parallel to the sensor when seen from above the touch layer, wherein at least one among the first touch electrode, the second touch electrode, the third touch electrode, and the fourth touch electrode, which are positioned in the designated region, may have a smaller part per unit area, which is not used as an electrode, than a touch electrode positioned outside the designated region.

Advantageous Effects of Invention

According to various embodiments, an electronic device can have a wire, formed around an opening, for an electrical connection between touch electrodes, and thus can improve the accuracy of touch input around the opening.

According to various embodiments, it is possible to improve the accuracy of touch input around an opening by forming a compensation pattern for sensitivity improvement around the opening.

MODE FOR THE INVENTION

Figure 1:
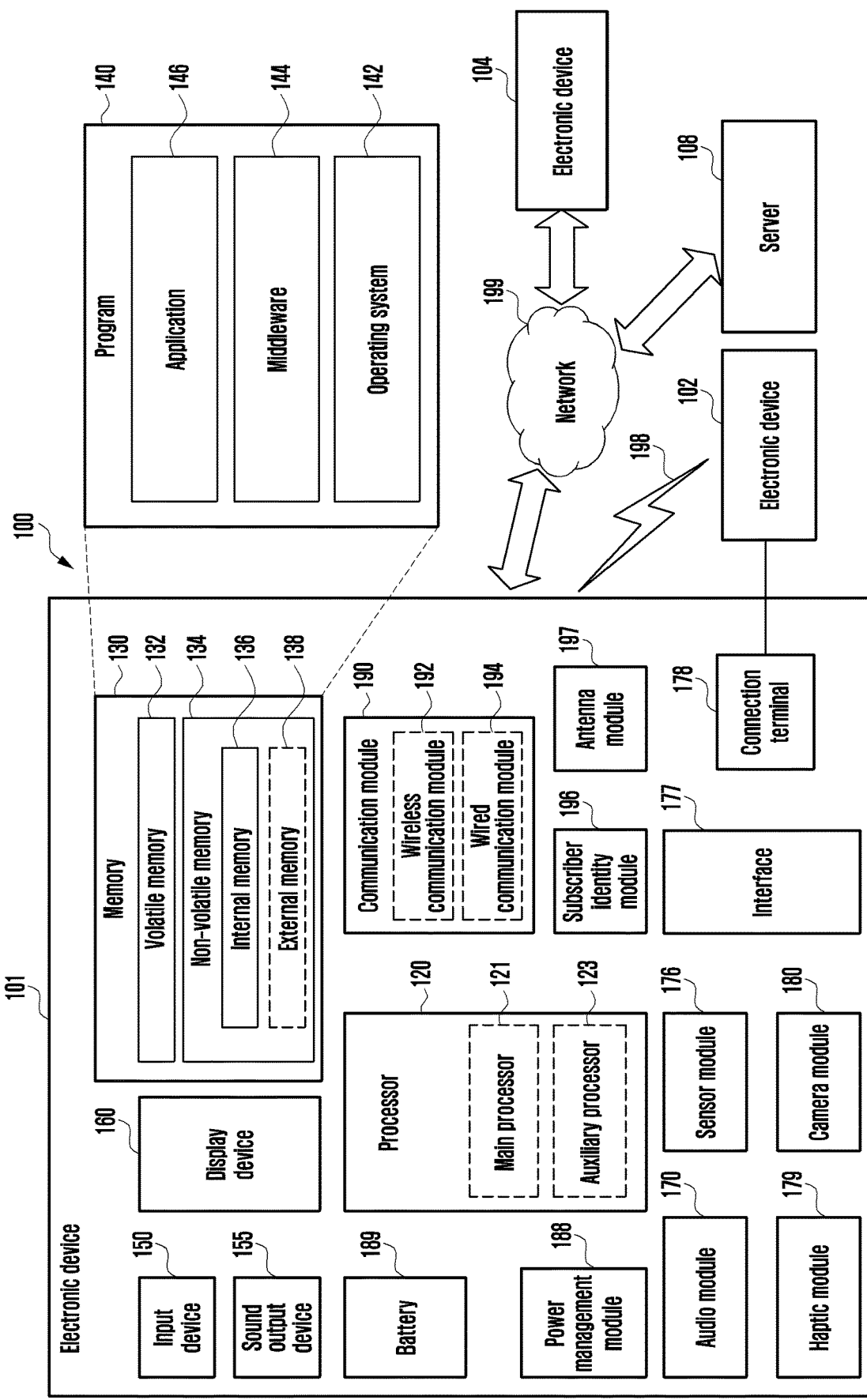
FIG. 1 illustrates an electronic device, including a touch layer having an opening, in a network environment according to various embodiments.

FIG. 1 is a block diagram of an electronic device 101, including a touch layer having an opening, in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
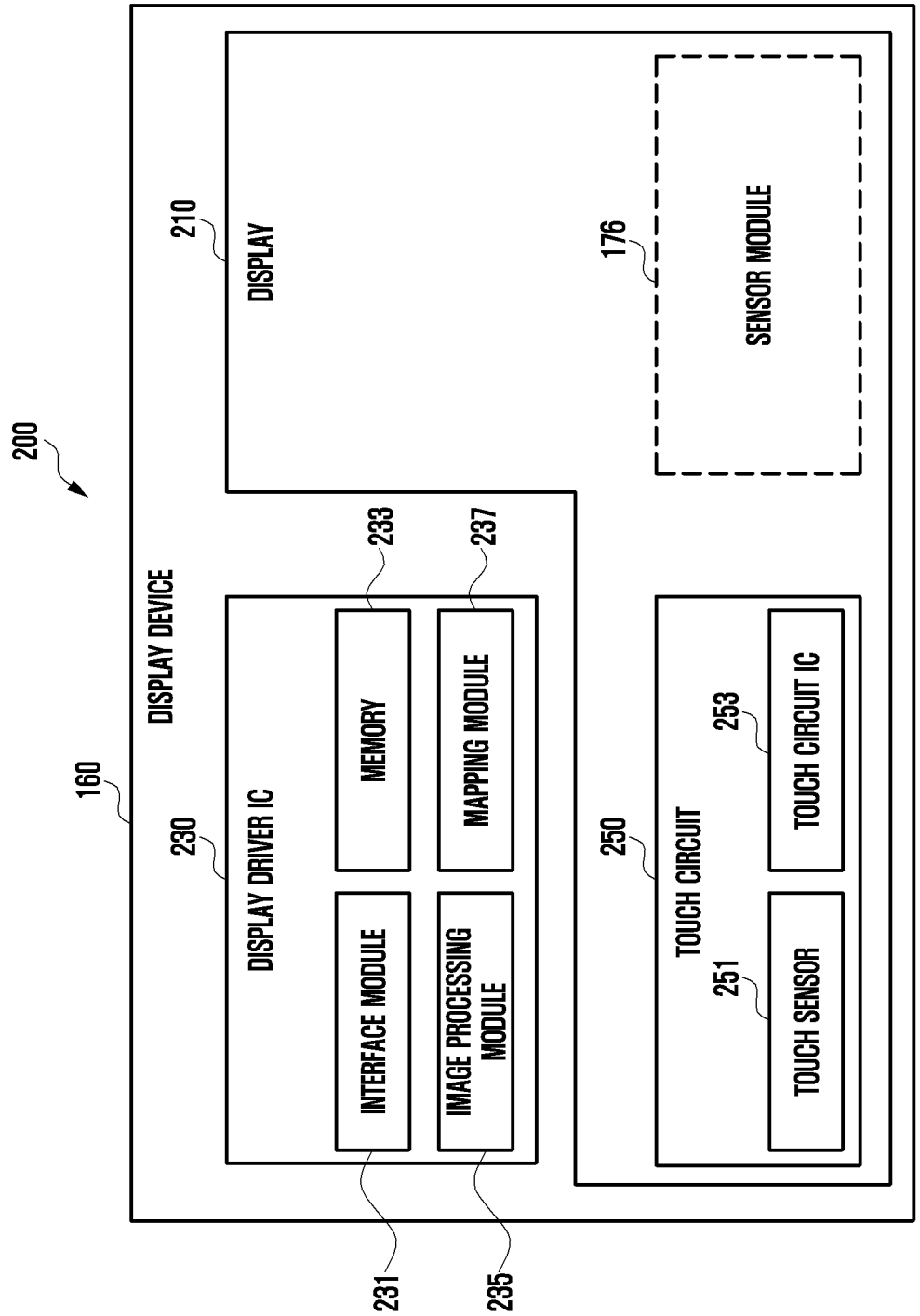
FIG. 2 is a block diagram of a display device including a touch layer having an opening according to various embodiments.

FIG. 2 is a block diagram 200, according to various embodiments, illustrating the display device 160 including a touch layer having an opening. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
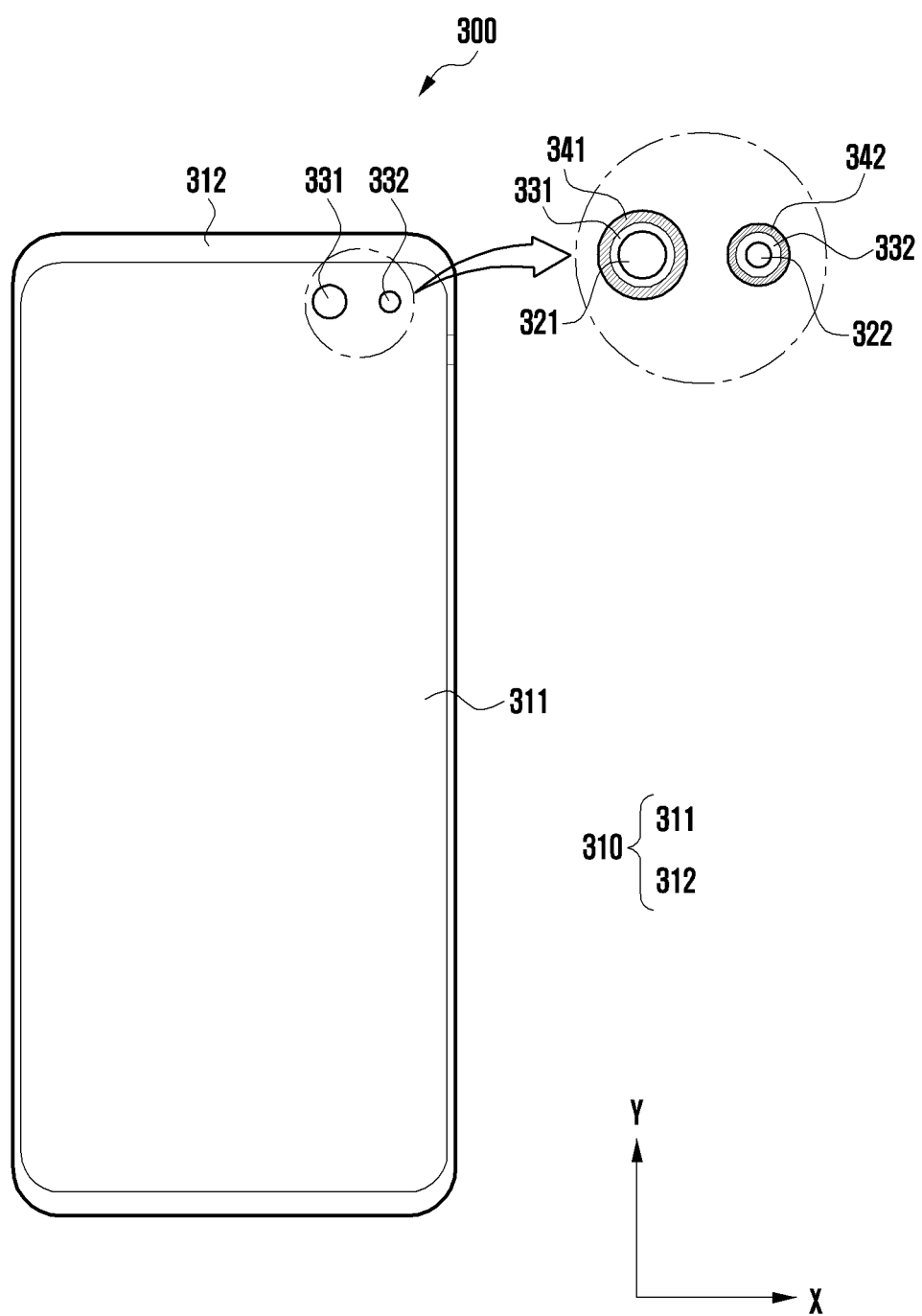
FIG. 3 is a front view of an electronic device according to various embodiments.

FIG. 3 is a front view of an electronic device 300 according to various embodiments. Referring to FIG. 3, the electronic device 300 (e.g. the electronic device 101 in FIG. 1) may include a touch screen display 310 (e.g. the display 210 in FIG. 2) which can output image data through at least a partial region of the front surface and/or the side surface thereof.

According to various embodiments, the display 310 may include a display region 311, in which image data is output, and a non-display region (or non-active region) 312, which is a region other than the display region. According to one embodiment, multiple pixels and multiple touch electrodes of a touch sensor (e.g. the touch sensor 251 in FIG. 2) may be arranged in the display region 311. The non-display region 312 may refer to a region other than the display region 311 in a region forming the exterior of the display 310 of the electronic device 300. For example, a touch sensor control circuit (e.g. the touch sensor IC 253 in FIG. 2) and/or a display driving circuit (e.g. the DDI 230 in FIG. 2) may be arranged in the non-display region 312.

According to various embodiments, at least one opening may be formed in a designated region of the display 310, and a sensor, which is capable of being visually exposed through the opening, may be disposed under the designated region. For example, a first opening 331 and a second opening 332 may be formed in an upper-right region of the display region 311. When surrounding parts around the openings 331 and 332 are enlarged, a first sensor 321 (e.g. an image sensor) and a second sensor 322 (e.g. an illumination sensor) may be arranged under the upper-right region of the display region 311, and thus may be visually exposed through the openings 331 and 332, respectively. Dead spaces (DSs) (e.g. printing regions) 341 and 342, serving as non-active regions which are not used as a display area, may be formed in the respective surrounding parts around the openings 331 and 332. According to one embodiment, the openings 331 and 332 may be formed in the display region 311 such that multiple pixels are not arranged inside but surround the openings. According to one embodiment, the openings 331 and 332 may refer to regions in which a smaller number of pixels are arranged in the same area, compared with pixels of the display region 311. According to one embodiment, each of the openings 331 and 332 may include a region in which at least one wire electrically connected to a pixel is not disposed. A wire may bypass the openings 331 and 332 through the dead spaces 341 and 342. According to one embodiment, each of the openings 331 and 332 may include a region in which touch electrodes of a touch sensor (e.g. the touch sensor 251 in FIG. 2) are not arranged and which is surrounded by the touch electrodes. A connection wire may be disposed in each of the dead spaces 341 and 342, and the touch electrodes may be electrically connected to each other through the connection wire.

Figure 4:
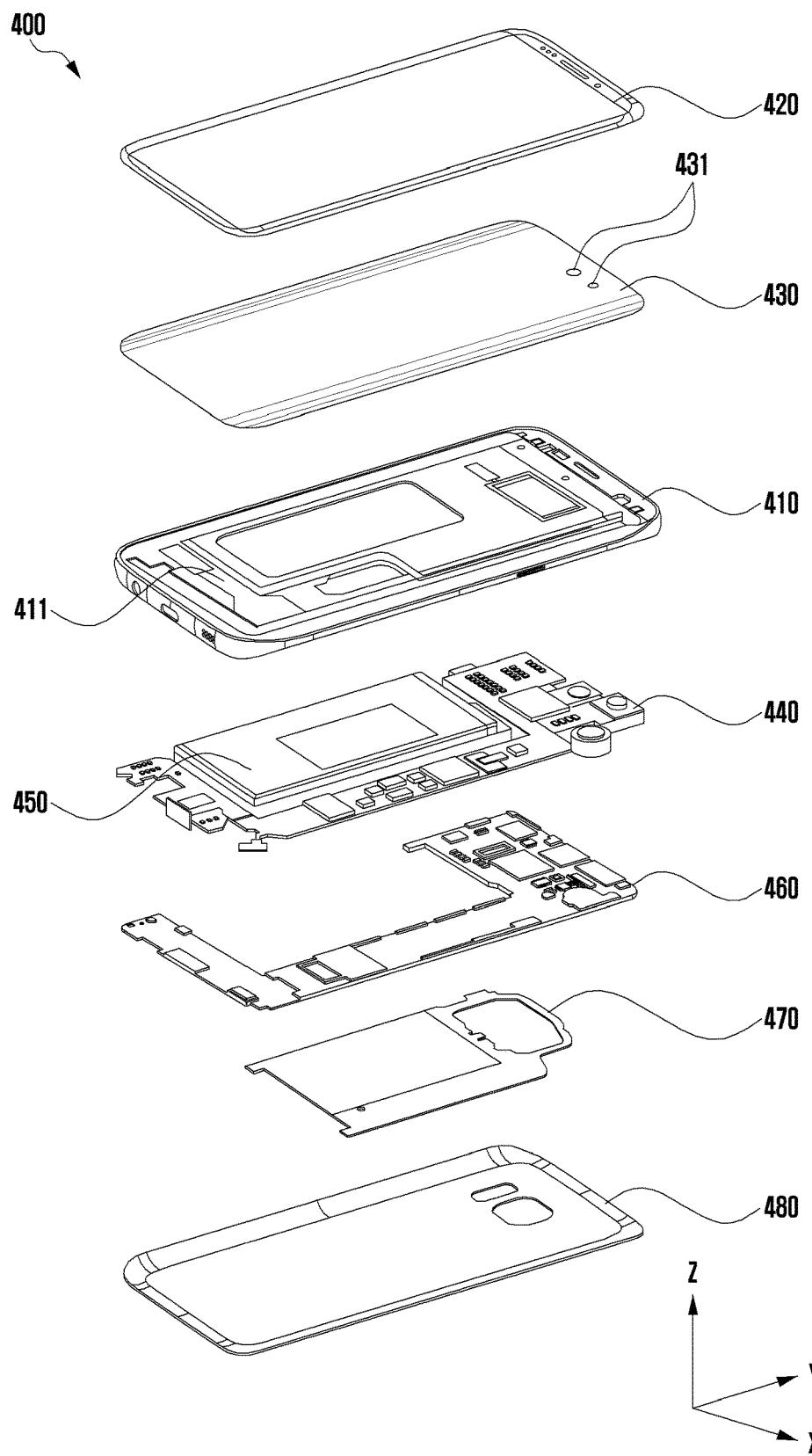
FIG. 4 is an exploded perspective view of an electronic device according to various embodiments.

FIG. 4 is an exploded perspective view of an electronic device 400 according to various embodiments. Referring to FIG. 4, the electronic device 400 (e.g. the electronic device 300 in FIG. 3) may include a side bezel structure 410, a first support member 411 (e.g. a bracket), a front plate 420, a display 430 (e.g. the display 310 in FIG. 3), a printed circuit board 440, a battery 450, a second support member 460 (e.g.

a rear case), an antenna 470, and a rear plate 480. In an embodiment, the electronic device 400 may omit at least one of the elements (e.g. the first support member 411 or the second support member 460), or may additionally include another element.

According to various embodiments, the front plate 420 may form the front surface (or a first surface) of the electronic device 400, and at least a part of the front plate 420 may be substantially transparent.

According to various embodiments, the rear plate 480 may form the rear surface (or a second surface) of the electronic device 400, and may be substantially opaque.

According to various embodiments, the side bezel structure 410 may form a side surface surrounding a space between the front surface and the rear surface.

According to various embodiments, the first support member 411 may be disposed in the space, and may be connected to the side bezel structure 410, or may be formed integrally with the side bezel structure 410. The first support member 411 may be made, for example, of a metal material and/or a nonmetal (e.g. polymer) material. The display 430 disposed in the space may be coupled to one surface of the first support member 411, and the printed circuit board 440 disposed in the space may be coupled to the other surface thereof.

According to various embodiments, a processor, a memory, an interface, and/or a sensor may be mounted on the printed circuit board 440. The processor may include one or more among, for example, a central processing unit, an application processor, a graphics processing unit, an image signal processor, a sensor hub processor, or a communication processor. The memory may include, for example, volatile memory or nonvolatile memory. The interface may include, for example, a high definition multimedia interface (HDMI), a universal serial bus (USB) interface, an SD card interface, and/or an audio interface. The interface may electrically or physically connect, for example, the electronic device 300 to an external electronic device, and may include a USB connector, an SD card/MMC connector, or an audio connector. The sensor is disposed on the printed circuit board 440 so as to be parallel to openings 431 (e.g. the openings 331 and 332 in FIG. 3) formed in the display 430 (parallel to the openings when seen from above the display 430 in the Z-axis direction in FIG. 4), and thus is capable of being visually exposed to the outside through the openings 431.

According to various embodiments, the display 430 may include: a touch layer (or a touch panel) (not shown) in which touch electrodes of a touch sensor (e.g. the touch sensor 251 in FIG. 2) are formed; and a display panel (not shown) in which multiple pixels are formed. According to one embodiment, the touch layer may be formed in the same layer as the display panel. For example, the touch layer may be understood as touch electrodes which may be arranged between pixels. According to one embodiment, the touch layer may be formed as a layer different from that of the display panel. For example, the touch layer may be understood as a touch panel corresponding to a layer different from the display panel. For example, the touch panel may be laminated on or beneath the display panel. Each of the openings 431 may include a first opening (not shown) and a second opening (not shown). The first opening may be formed in the display panel, and the second opening may be formed in the touch layer so as to be parallel to the first opening (e.g. parallel to the first opening when seen from above the display 430 in the Z-axis direction in FIG. 4). According to one embodiment, the touch layer may include: multiple first touch lines arranged in a first direction (e.g. the X-axis direction in FIG. 4); and multiple second touch lines arranged in a second direction (e.g. the Y-axis direction in FIG. 4). For example, the first touch lines and the second touch lines may be formed in the same layer. In another example, the first touch lines and the second touch lines may be formed in different layers.

According to various embodiments, the battery 450 is a unit for supplying power to at least one element of the electronic device 400, and may include, for example, a non-rechargeable primary battery, a rechargeable secondary battery, or a fuel cell. At least a part of the battery 450 may be disposed, for example, in substantially the same plane as the printed circuit board 440. The battery 450 may be integrally disposed in the electronic device 400, and may be disposed to be attachable to and detachable from the electronic device 400.

According to various embodiments, the antenna 470 may be disposed between the rear plate 480 and the battery 450. The antenna 470 may include, for example, a near-field communication (NFC) antenna, a wireless charging antenna, and/or a magnetic secure transmission (MST) antenna. For example, the antenna 470 may perform short-range communication with an external device, or may wirelessly transmit or receive power necessary for charging. In another example, an antenna structure may be formed by one of the side bezel structure 410 and/or the first support member 411 or by a combination thereof.

Figure 5:
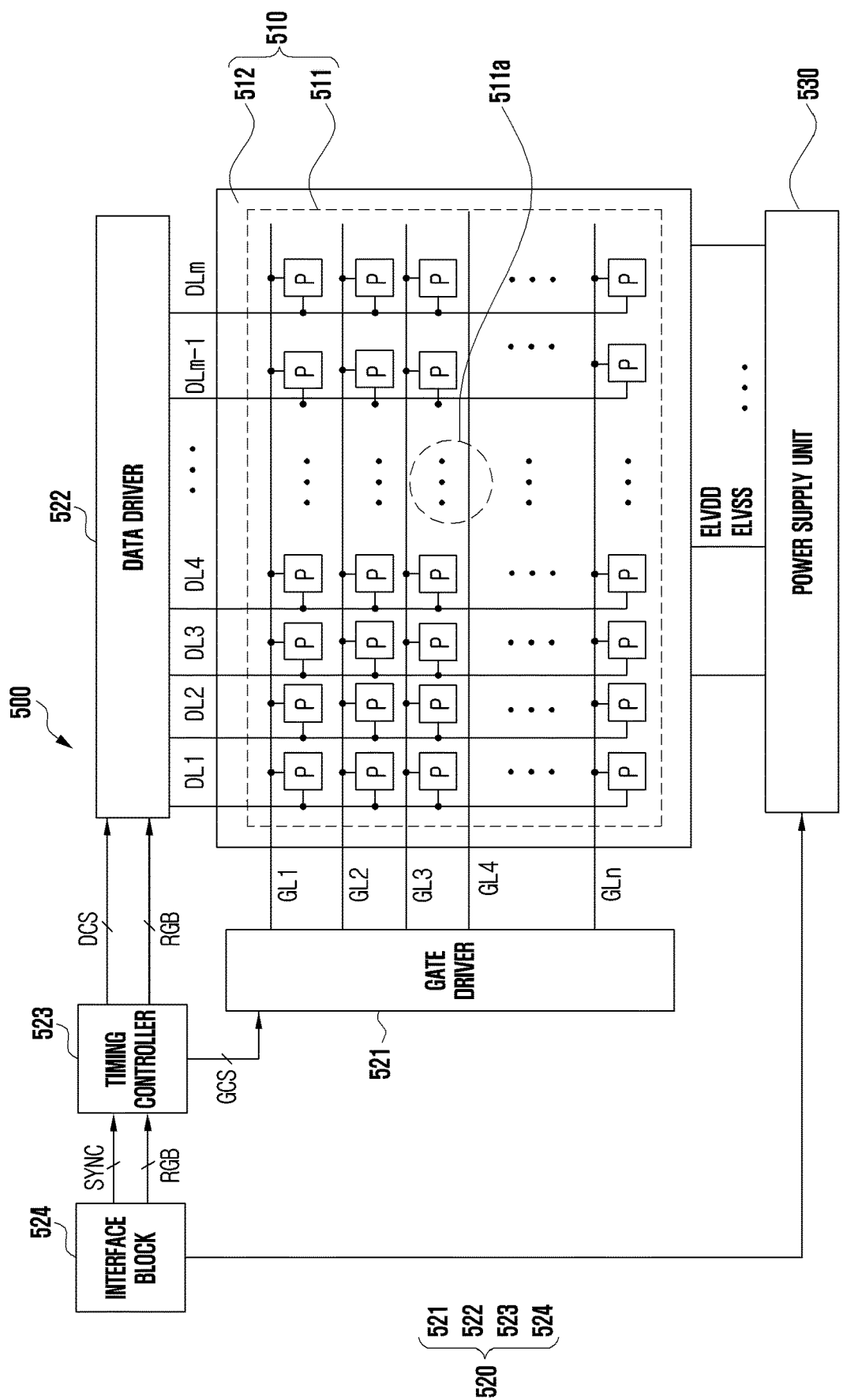
FIG. 5 is a block diagram illustrating a display panel, a display driver, and a power supply unit according to various embodiments.

FIG. 5 is a block diagram 500 illustrating a display panel 510, a display driver 520, and a power supply unit 530 according to various embodiments.

Referring to FIG. 5, the display 510 (e.g. the display 210 in FIG. 2) may include a display region 511 and a non-display region 512. According to one embodiment, the display 510 is formed of multiple pixels, and the pixels may include multiple subpixels (Ps). The display 510 may include multiple gate lines (GLs) (e.g. GL1 to GLn) and multiple data lines (DLs) (e.g. DL1 to DLm), which cross each other. A subpixel (P) may be formed in a region in which a gate line (GL) crosses a data line (DL). Each subpixel (P) may include an organic light-emitting diode (OLED) and at least one driving circuit for driving the organic light-emitting diode.

The display driver 520 (e.g. the DDI 230 in FIG. 2) for driving the display 510 may include a gate driver 521 (or a scan driver), a data driver 522, a timing controller 523, or an interface block 524. According to various embodiments, the display region 511 may include at least one opening 511a (e.g. the first openings 331 or the second opening 332 in FIG. 3) in which at least one sensor (e.g. a camera sensor, a proximity sensor, an infrared sensor, etc.) is disposed (or through which the sensor is visually exposed). According to one embodiment, the opening 511a surrounded by the display region 511 may be shaped in a form corresponding to the form (e.g. the shape and the size) of each sensor such that the corresponding sensor is disposed therein (or exposed therethrough).

The driving circuit provided in each subpixel (P) may include at least one switch (e.g. a thin film transistor (TFT)) (hereinafter, referred to as a "thin film transistor"), at least one capacitor (e.g. a storage capacitor (CST), or a light-emitting element (e.g. an organic light-emitting diode).

The at least one thin film transistor (TFT) may charge a capacitor with a data voltage supplied from a data line (DL) in response to a scan signal supplied from a gate line (GL). The at least one thin film transistor (TFT) may control the amount of current supplied to an organic light-emitting diode according to the data voltage with which the capacitor has been charged.

The gate driver 521 may supply a scan signal (or a scan pulse) to the multiple gate lines (GL1 to GLn) according to at least one gate control signal (GCS) provided from the timing controller 523. The gate driver 521 may include a gate shift register for outputting a scan signal. The scan signal is sequentially supplied to respective pixels, and may include a single signal or multiple signals. When a scan signal includes multiple signals, each gate line (GL) may include multiple lines for supplying the multiple scan signals to respective pixels. For example, the gate driver 521 may be connected to a column line corresponding to a cathode terminal of the display 510 so as to sequentially select the corresponding column line.

The data driver 522 may convert image data (RGB) provided from the timing controller 523 into a data voltage according to at least one data control signal (DCS) provided from the timing controller 523. The data driver 522 may generate a data voltage by using multiple gamma compensation voltages. The data driver 522 may sequentially supply the generated data voltage to multiple pixels in line units (or in row units). The data driver 522 may include: a data shift register for outputting a sampling signal; a latch circuit for latching image data (RGB) in line units in response to the sampling signal; and a digital-to-analog converter (DAC) for converting the latched image data into an analog gray voltage (e.g. a pixel voltage).

The timing controller 523 may align image data (RGB) provided from the interface block 524 in accordance with the size and resolution of the display 510. The timing controller 523 may supply the aligned image data (RGB) to the data driver 522. The timing controller 523 may transmit multiple control signals (e.g. GCS and DCS) by using at least one synchronization signal (SYNC) provided from the interface block 524. The multiple control signals (e.g. GCS and DCS) may include at least one gate control signal (GCS) and at least one data control signal (DSC). The gate control signal (GCS) may be a signal for controlling the driving timing of the gate driver 521. The data control signal (DCS) may be a signal for controlling the driving timing of the data driver 522. The synchronization signals (SYNCs) may include a dot clock (DCLK), a data enable signal (DE), a horizontal synchronization signal (Hsync), or a vertical synchronization signal (Vsync).

According to one embodiment, the interface block 524 may receive image data (RGB) from a processor (e.g. the processor 120 in FIG. 1), and may transmit the received image data (RGB) to the timing controller 523. The interface block 524 may generate at least one synchronization signal (SYNC), and may transmit the synchronization signal (SYNC) to the timing controller 523. The interface block 524 may control the power supply unit 530 (e.g. the power management module 188 in FIG. 1) to supply at least one driving voltage (e.g. ELVDD, ELVSS, etc.) to the display 510.

According to one embodiment, the power supply unit 530 may generate at least one driving voltage (e.g. ELVDD or ELVSS) necessary for driving the display 510, and may supply the generated driving voltage to the display 510. According to one embodiment, the power supply unit 530 may include a single power supply unit or multiple power supply units so as to independently supply at least one driving voltage to a region in which at least one sensor is disposed (e.g. at least a part of the display region 511). The at least one driving voltage may include, for example, ELVDD, ELVSS, a gate-on voltage, a gate-off voltage, or an initialization voltage. According to one embodiment, the gate-on voltage may be a voltage for turning on the at least one thin film transistor (TFT) provided in the display 510. The gate-off voltage may be a voltage for turning off the at least one thin film transistor (TFT) provided in the display 510. The initialization voltage may be a voltage for initializing at least one node arranged on the driving circuit configured to drive at least one subpixel (P) among multiple subpixels (Ps).

Figure 6:
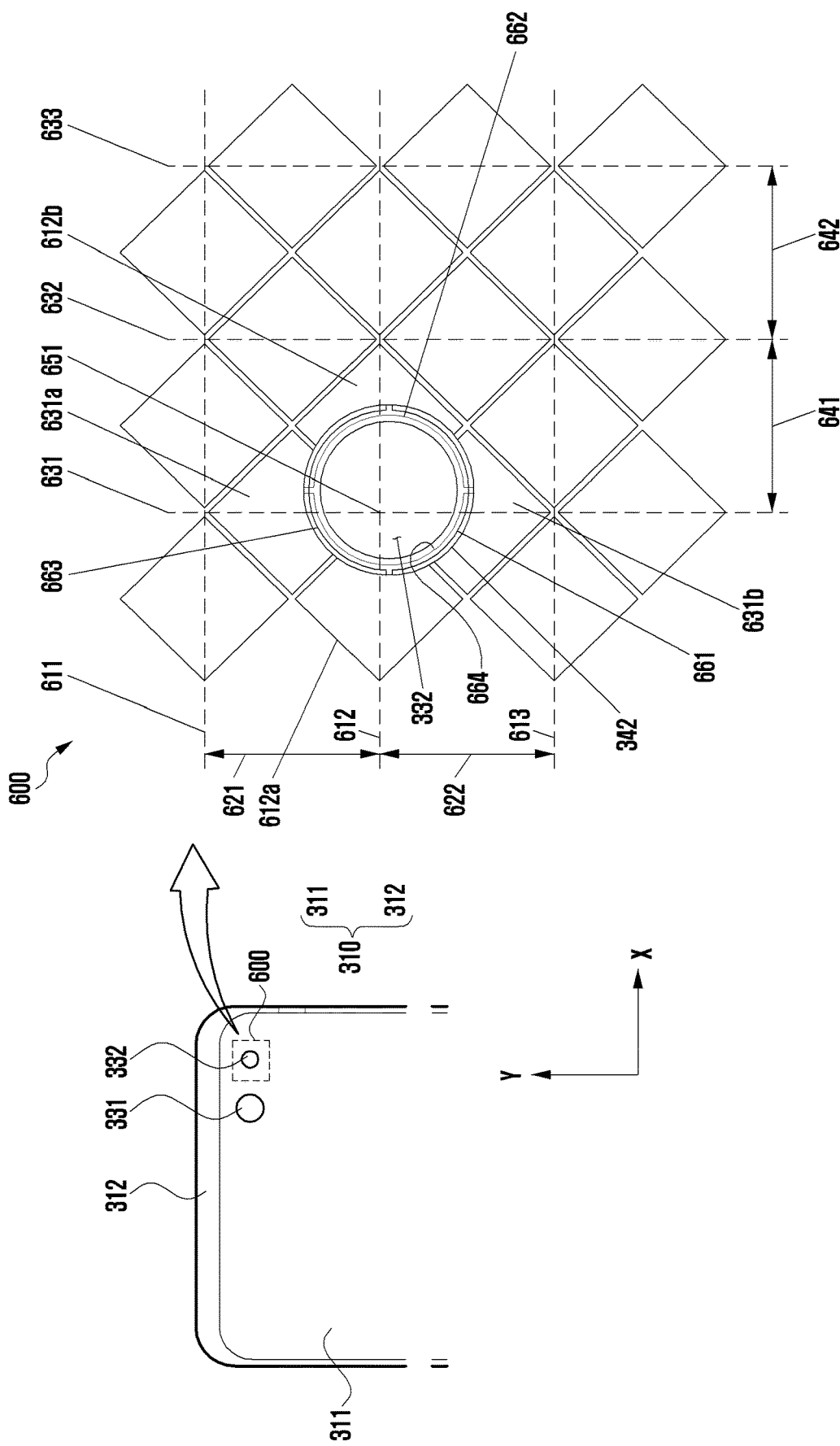
FIG. 6 illustrates a display, having a wiring structure for connecting touch electrodes around an opening to each other, according to various embodiments.

FIG. 6 illustrates a display, having a wiring structure for connecting touch electrodes around an opening to each other, according to various embodiments. Referring to FIG. 6, the display region 311 (e.g. the display region 511 in FIG. 5) of the display 310 (e.g. the display 510) may include: multiple first touch lines arranged in the Y-axis direction; and multiple second touch lines arranged in the X-axis direction while crossing the first touch lines. At least one of the first touch lines and at least one of the second touch lines may be arranged around the first opening 331 and the second opening 332. When a surrounding part 600 surrounding the second opening 332 is enlarged and viewed as illustrated, a (1-1)th touch line 611, a (1-2)th touch line 612, and a (1-3)th touch line 613 may be arranged in the X-axis direction in the surrounding part 600. The pitch between adjacent touch lines in the X-axis direction may be constant. For example, a (1-1)th pitch 621 may be equal to a (1-2)th pitch 622. In another example, the (1-1)th pitch 621 may be different from the (1-2)th pitch 622. In the surrounding part 600, a (2-1)th touch line 631, a (2-2)th touch line 632, and a (2-3)th touch line 633 may be arranged in the Y-axis direction while crossing the (1-1)th touch line 611, the (1-2)th touch line 612, and the (1-3)th touch line 613. The pitch between adjacent touch lines in the Y-axis direction may be constant. For example, a (2-1)th pitch 641 may be equal to a (2-2)th pitch 642. In another example, the (2-1)th pitch 641 may be different from the (2-2)th pitch 642. A touch sensor IC (e.g. the touch sensor IC 253 in FIG. 2) may sequentially output a signal (e.g. a scan signal) to the (2-1)th touch line 631, the (2-2)th touch line 632, and the (2-3)th touch line 633. The touch sensor IC may sense a touch input or a hovering input to a particular position in the surrounding part 600 by measuring a change (e.g. capacitance) in the signal via the (1-1)th touch line 611, the (1-2)th touch line 612, and the (1-3)th touch line 613.

According to various embodiments, touch electrodes around an opening may be electrically connected via a connection wire formed around the opening. According to one embodiment, the second opening 332 may be formed at a point 651 where the (1-2)th touch line 612 crosses the (2-1)th touch line 631. For example, the second opening 332 may be formed such that the center of the second opening 332 is close to the point 651. The dead space 342 (e.g. a printing region) may be formed around the second opening 332. Thus, in the (1-2)th touch line 612 including a first touch electrode 612*a* and a second touch electrode 612*b*, a part of the first touch electrode 612*a* and a part of the second touch electrode 612*b* may be lost due to the second opening 332. As a result, the first touch electrode 612*a* and the second touch electrode 612*b* may be electrically disconnected from each other. However, the first touch electrode 612*a* and the second touch electrode 612*b* may be electrically connected to each other via a first connection wire 661 disposed around the second opening 332 and bypassing the second opening 332. In the (2-1)th touch line 631 including a third touch electrode 631*a* and a fourth touch electrode 631*b*, a part of the third touch electrode 631*a* and a part of the fourth touch electrode 631b may be lost due to the second opening 332. As a result, the third touch electrode 631a and the fourth touch electrode 631b may be electrically disconnected from each other. However, the third touch electrode 631a and the fourth touch electrode 631b may be electrically connected to each other via a second connection wire 662 disposed around the second opening 332 and bypassing the second opening 332.

According to various embodiments, touch electrodes around an opening may be electrically connected via multiple connection wires formed around the opening. For example, the first touch electrode 612a may be electrically connected to the second touch electrode 612b via the first connection wire 661 bypassing the second opening 332 in the counterclockwise direction and a third connection wire 663 bypassing the second opening 332 in the clockwise direction. The third touch electrode 631a may be electrically connected to the fourth touch electrode 631b via the second connection wire 662 bypassing the second opening 332 in the counterclockwise direction and a fourth connection wire 664 bypassing the second opening 332 in the clockwise direction.

According to various embodiments, at least some of the connection wires may be arranged inside the dead space 342. For example, the first connection wire 661, the second connection wire 662, the third connection wire 663, and/or the fourth connection wire 664 may be positioned inside the dead space 342.

According to various embodiments, a connection wire (e.g. the first connection wire 661, the second connection wire 662, the third connection wire 663, and/or the fourth connection wire 664) may be formed of one of metal, metal mesh, silver nano (AgNW), graphene, carbon nanotubes, and indium tin oxide (ITO) or a combination of at least two thereof.

According to various embodiments, a touch electrode may be a metal, a metal mesh, or a combination thereof, and the shape of the touch electrode may be a diamond shape, as illustrated in FIG. 6. However, the touch electrode is not limited to having a diamond shape, but may have various shapes such as a rectangular shape.

Figure 7A:
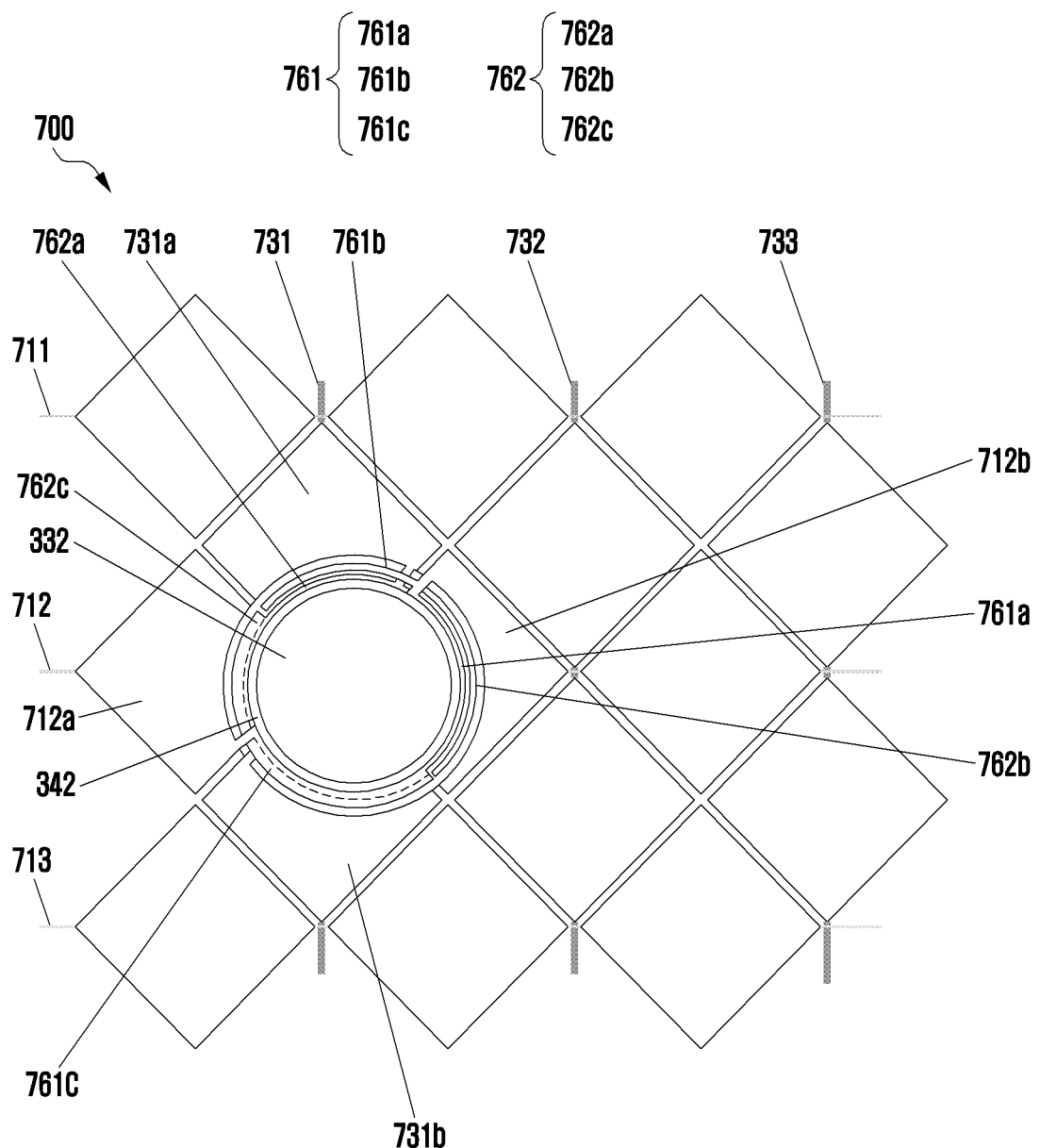
FIG. 7A illustrates a display, having a wiring structure for compensating touch sensitivity around an opening, according to various embodiments.
Figure 7B:
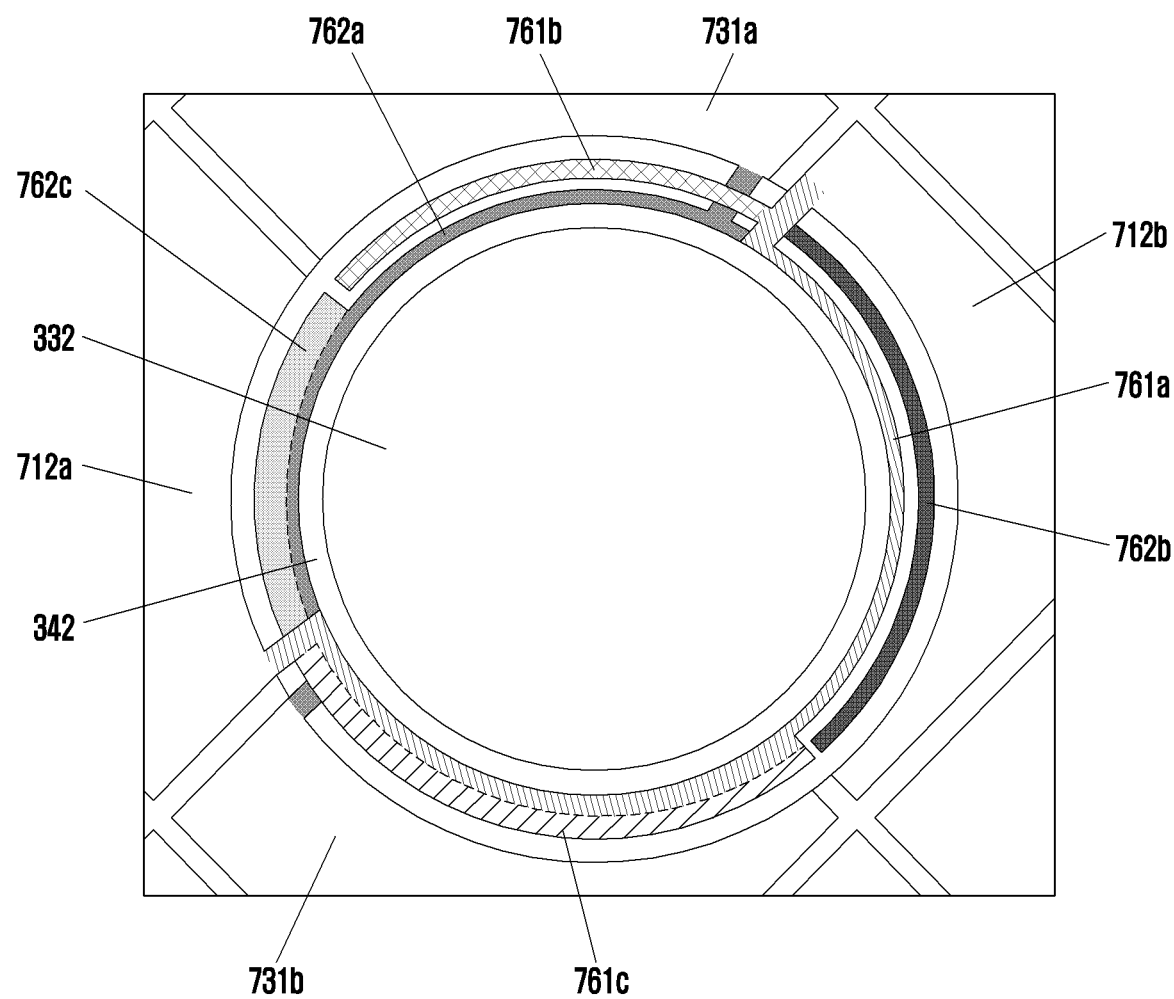
FIG. 7B shows the surrounding part around the opening in FIG. 7A in an enlarged state.

FIG. 7A illustrates a display, having a wiring structure for compensating touch sensitivity around an opening, according to various embodiments. FIG. 7B shows the surrounding part around the opening in FIG. 7A in an enlarged state. For the convenience of description, elements overlapping those in FIG. 6 will be described briefly, or a description thereof will be omitted. Referring to FIG. 7A, in a surrounding part 700 (e.g. the surrounding part 600 in FIG. 6), a (1-1)th touch line 711, a (1-2)th touch line 712, and a (1-3)th touch line 713 may be arranged in the X-axis direction, and a (2-1)th touch line 731, a (2-2)th touch line 732, and a (2-3)th touch line 733 may be arranged in the Y-axis direction while crossing the (1-1)th touch line 711, the (1-2)th touch line 712, and the (1-3)th touch line 713. A first touch electrode 712a and a second touch electrode 712b included in the (1-2)th touch line 712 may be arranged around the second opening 332, and may be electrically connected to each other via a first connection wire 761 bypassing the second opening 332. A third touch electrode 731a and a fourth touch electrode 731b included in the (2-1)th touch line 731 may be arranged around the second opening 332, and may be electrically connected to each other via a second connection wire 762 bypassing the second opening 332.

According to various embodiments, a compensation pattern for compensating touch sensitivity (e.g. mutual capacitance sensitivity) around an opening may be formed around the opening. A part of each of the first touch electrode 712a, the second touch electrode 712b, the third touch electrode 731a, and the fourth touch electrode 731b is lost due to the second opening 332. Thus, touch sensitivity around the second opening 332 may be reduced. The first connection wire 761 and the second connection wire 762 are patterns for minimizing a reduction in touch sensitivity around the second opening 332, and may be formed around the second opening 332. For example, the first connection wire 761 may extend, in the dead space 342, to be longer than the first connection wire 661 in FIG. 6, and at least a part of the first connection wire 761 may extend in the dead space 342 while being thicker than the first connection wire 661 in FIG. 6. In other words, referring to FIG. 7B, the first connection wire 761 may include: a first part 761a connecting the first touch electrode 712a to the second touch electrode 712b; a second part 761b elongated from the first part 761a in the dead space 342; and a third part 761c which is thick and extends from the first part 761a in the dead space 342. The second connection wire 762 may extend, in the dead space 342, to be longer than the second connection wire 662 in FIG. 6. At least a part of the second connection wire 762 may extend in the dead space 342 while being thicker than the second connection wire 662 in FIG. 6. In other words, referring to FIG. 7B, the second connection wire 762 may include: a first part 762a connecting the third touch electrode 731a to the fourth touch electrode 731b; a second part 762b elongated from the first part 762a in the dead space 342; and a third part 762c which is thick and extends from the first part 762a in the dead space 342.

Figure 8A:
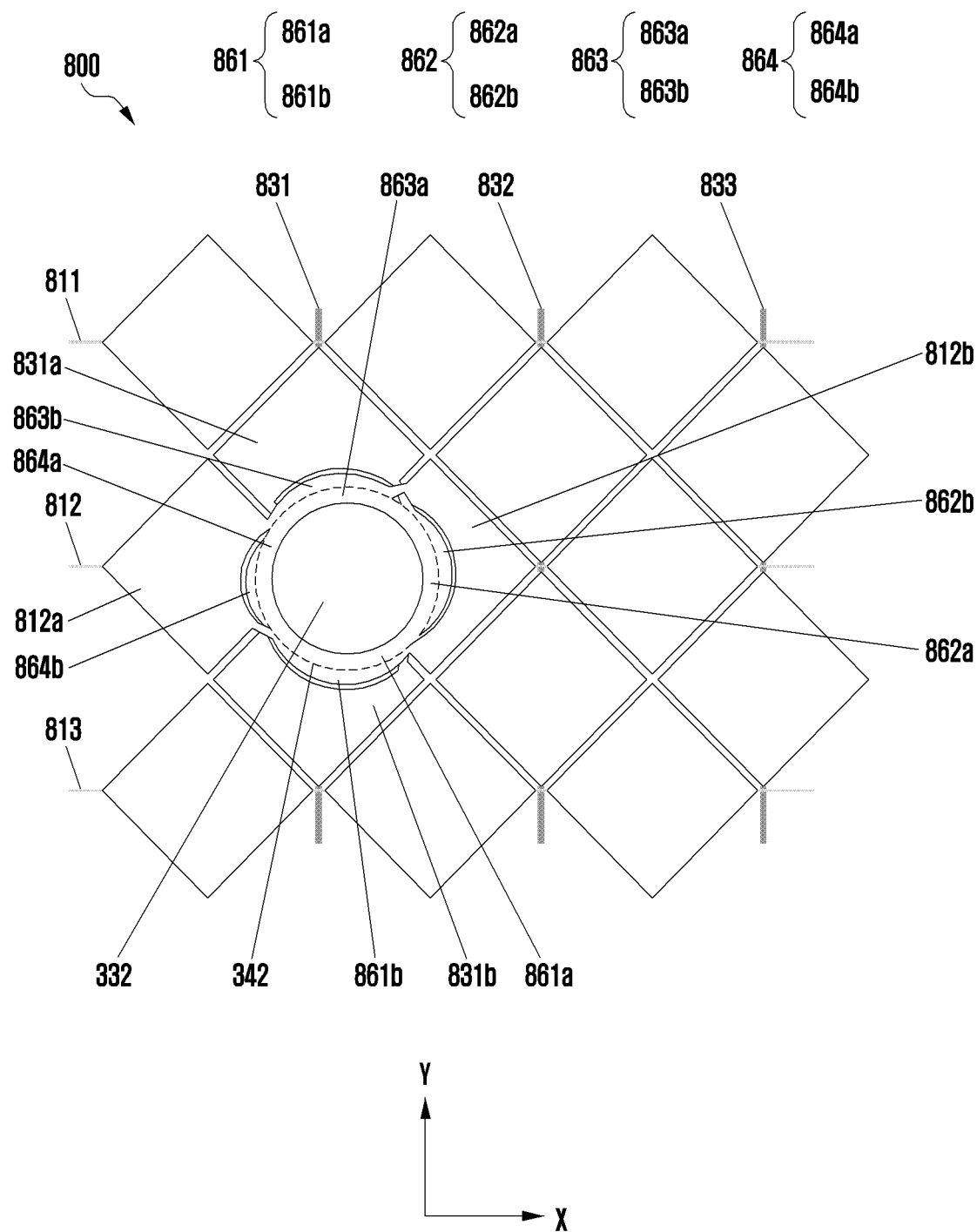
FIG. 8A illustrates a display, having a wiring structure for compensating touch sensitivity around an opening, according to various embodiments.
Figure 8B:
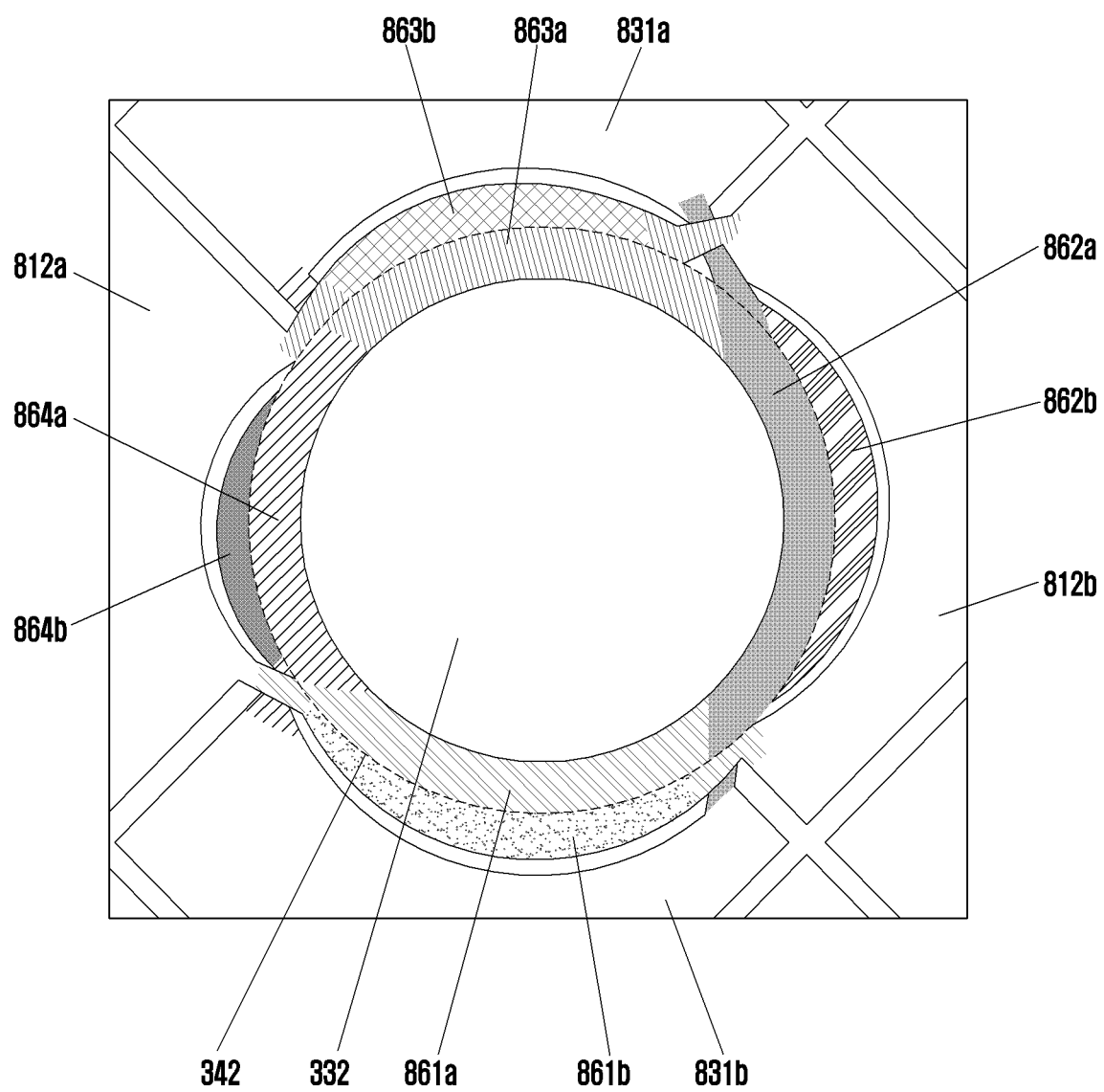
FIG. 8B shows a surrounding part around the opening in FIG. 8A in an enlarged state.

FIG. 8A illustrates a display, having a wiring structure for compensating touch sensitivity around an opening, according to various embodiments. FIG. 8B shows a surrounding part around the opening in FIG. 8A in an enlarged state. For the convenience of description, elements overlapping those in FIG. 6 will be described briefly, or a description thereof will be omitted. Referring to FIG. 8A, in a surrounding part 800 (e.g. the surrounding part 600 in FIG. 6), a (1-1)th touch line 811, a (1-2)th touch line 812, and a (1-3)th touch line 813 may be arranged in the X-axis direction, and each of a (2-1)th touch line 831, a (2-2)th touch line 832, and a (2-3)th touch line 833 may be arranged in the Y-axis direction while crossing the (1-1)th touch line 811, the (1-2)th touch line 812, and the (1-3)th touch line 813. A first touch electrode 812a and a second touch electrode 812b included in the (1-2)th touch line 812 may be arranged around the second opening 332. The first touch electrode 812a may be electrically connected to the second touch electrode 812b via a first connection wire 861 bypassing the second opening 332 in the counterclockwise direction and a third connection wire 863 bypassing the second opening 332 in the clockwise direction. A third touch electrode 831a may be electrically connected to a fourth touch electrode 831b via a second connection wire 862 bypassing the second opening 332 in the counterclockwise direction and a fourth connection wire 864 bypassing the second opening 332 in the clockwise direction.

According to various embodiments, a compensation pattern for compensating touch sensitivity around an opening may be formed around the opening. In one embodiment, a part of each of the first touch electrode 812a, the second touch electrode 812b, the third touch electrode 831a, and the fourth touch electrode 831b is lost due to the second opening 332. Thus, the touch sensitivity around the second opening 332 may be reduced. The first connection wire 861, the second connection wire 862, the third connection wire 863, and the fourth connection wire 864 are patterns for minimizing the reduction of the touch sensitivity around the second opening 332, and may be formed around the second opening 332. Describing one embodiment with reference to FIG. 8B, the first connection wire 861 may include: a first part 861a connecting the first touch electrode 812a to the second touch electrode 812b; and a second part 861b extending from the first part 861a to be adjacent to the fourth touch electrode 831b beyond the dead space 342. The second connection wire 862 may include: a first part 862a connecting the third touch electrode 831a to the fourth touch electrode 831b; and a second part 862b extending from the first part 862a to be adjacent to the second touch electrode 812b beyond the dead space 342. The third connection wire 863 may include: a first part 863a connecting the first touch electrode 812a to the second touch electrode 812b; and a second part 863b extending from the first part 863a to be adjacent to the third touch electrode 831a beyond the dead space 342. The fourth connection wire 864 may include: a first part 864a connecting the third touch electrode 831a to the fourth touch electrode 831b; and a second part 864b extending from the first part 864a to be adjacent to the first touch electrode 812a beyond the dead space 342.

According to various embodiments, a connection wire (e.g. the first connection wire 861, the second connection wire 862, the third connection wire 863, and/or the fourth connection wire 864) may be formed in a layer different from that of touch electrodes around an opening. For example, the layer in which the connection wire is formed may be disposed on or beneath a layer in which the touch electrodes are formed, and the connection wire layer may be electrically connected to the touch electrode layer through a via.

Figure 9:
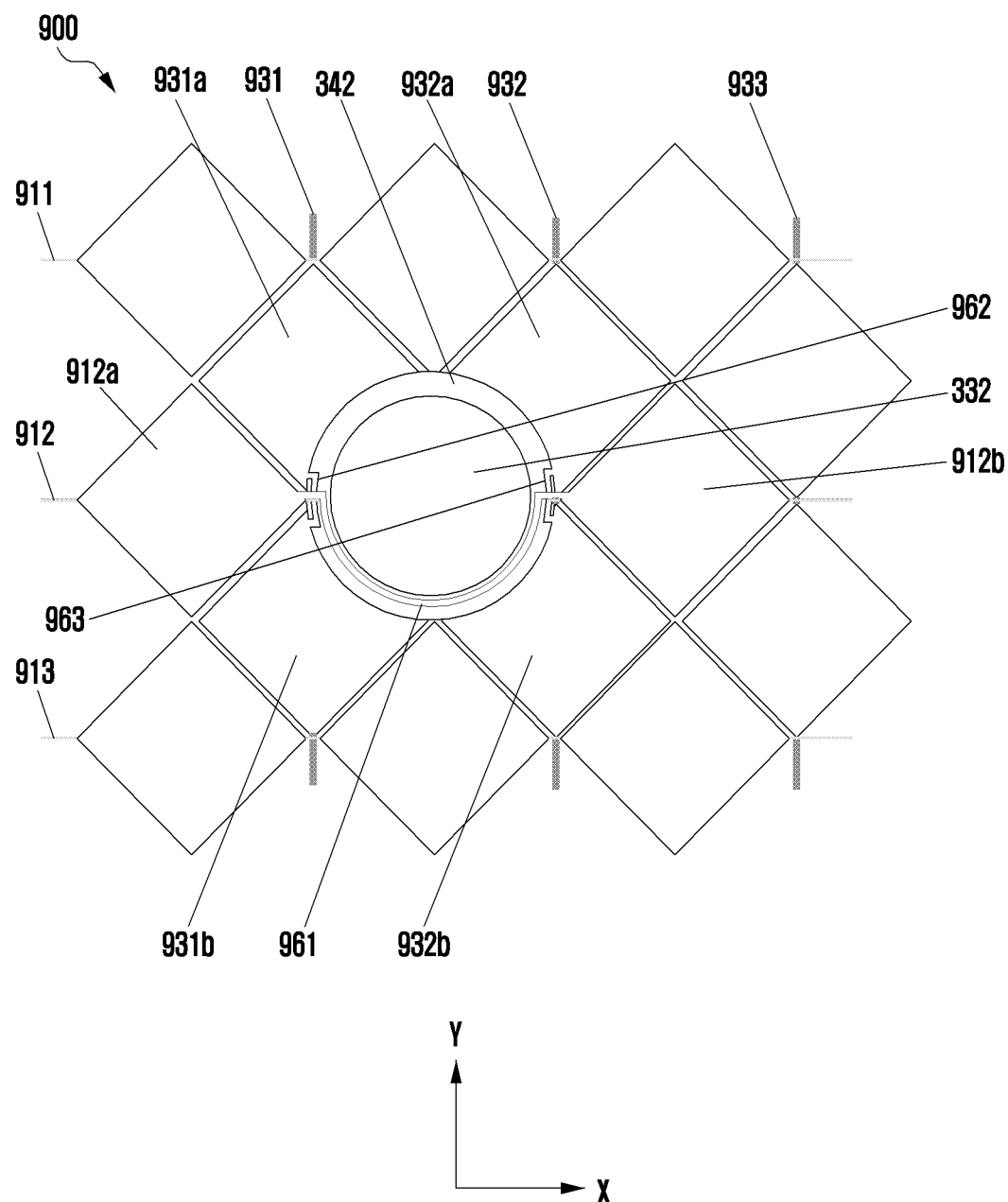
FIG. 9 illustrates a display having a wiring structure for connecting touch electrodes around an opening to each other, according to various embodiments.

FIG. 9 illustrates a display having a wiring structure for connecting touch electrodes around an opening to each other, according to various embodiments. For the convenience of description, elements overlapping those in FIG. 6 will be described briefly, or a description thereof will be omitted. Referring to FIG. 9, in a surrounding part 900 (e.g. the surrounding part 600 in FIG. 6), a (1-1)th touch line 911, a (1-2)th touch line 912, and a (1-3)th touch line 913 may be arranged in the X-axis direction, and a (2-1)th touch line 931, a (2-2)th touch line 932, and a (2-3)th touch line 933 may be arranged in the Y-axis direction while crossing the (1-1)th touch line 911, the (1-2)th touch line 912, and the (1-3)th touch line 913.

According to various embodiments, touch electrodes around an opening may be electrically connected to each other via a connection wire formed around the opening. In one embodiment, the second opening 332 may be formed such that at least a part of each of the touch electrodes is lost due to the second opening 332. For example, when the second opening 332 is formed such that the center of the second opening 332 is close to or is substantially aligned with the center of a touch electrode included in the (1-2)th touch line 912, the touch electrode may be lost. Thus, a first touch electrode 912a and a second touch electrode 912b are electrically disconnected from each other at the location of the lost touch electrode therebetween. However, the first touch electrode 912a may be electrically connected to the second touch electrode 912b via a first connection wire 961 disposed around the second opening 332 and bypassing the second opening 332. In the (2-1)th touch line 931, a third touch electrode 931a and a fourth touch electrode 931b may be partially lost due to the second opening 332 and the dead space 342 formed therearound. Thus, the third touch electrode 931a may be electrically disconnected from the fourth touch electrode 931b. However, the third touch electrode 931a may be electrically connected to the fourth touch electrode 931b via a second connection wire 962 disposed around the second opening 332. In the (2-2)th touch line 932, a fifth touch electrode 932a and a sixth touch electrode 932b may be partially lost due to the second opening 332 and the dead space 342. Thus, the fifth touch electrode 932a may be electrically disconnected from the sixth touch electrode 932b. However, the fifth touch electrode 932a may be electrically connected to the sixth touch electrode 932b via a third connection wire 963 disposed around the second opening 332.

According to various embodiments, a connection wire may be formed in a dead space. For example, the first connection wire 961, the second connection wire 962, and/or the third connection wire 963 may be positioned in the dead space 342.

According to various embodiments, a connection wire (e.g. the first connection wire 961, the second connection wire 962, and/or the third connection wire 963) may be formed of a metal or a metal mesh. Alternatively, a connection wire may be formed of a combination of a metal and a metal mesh.

Figure 10:
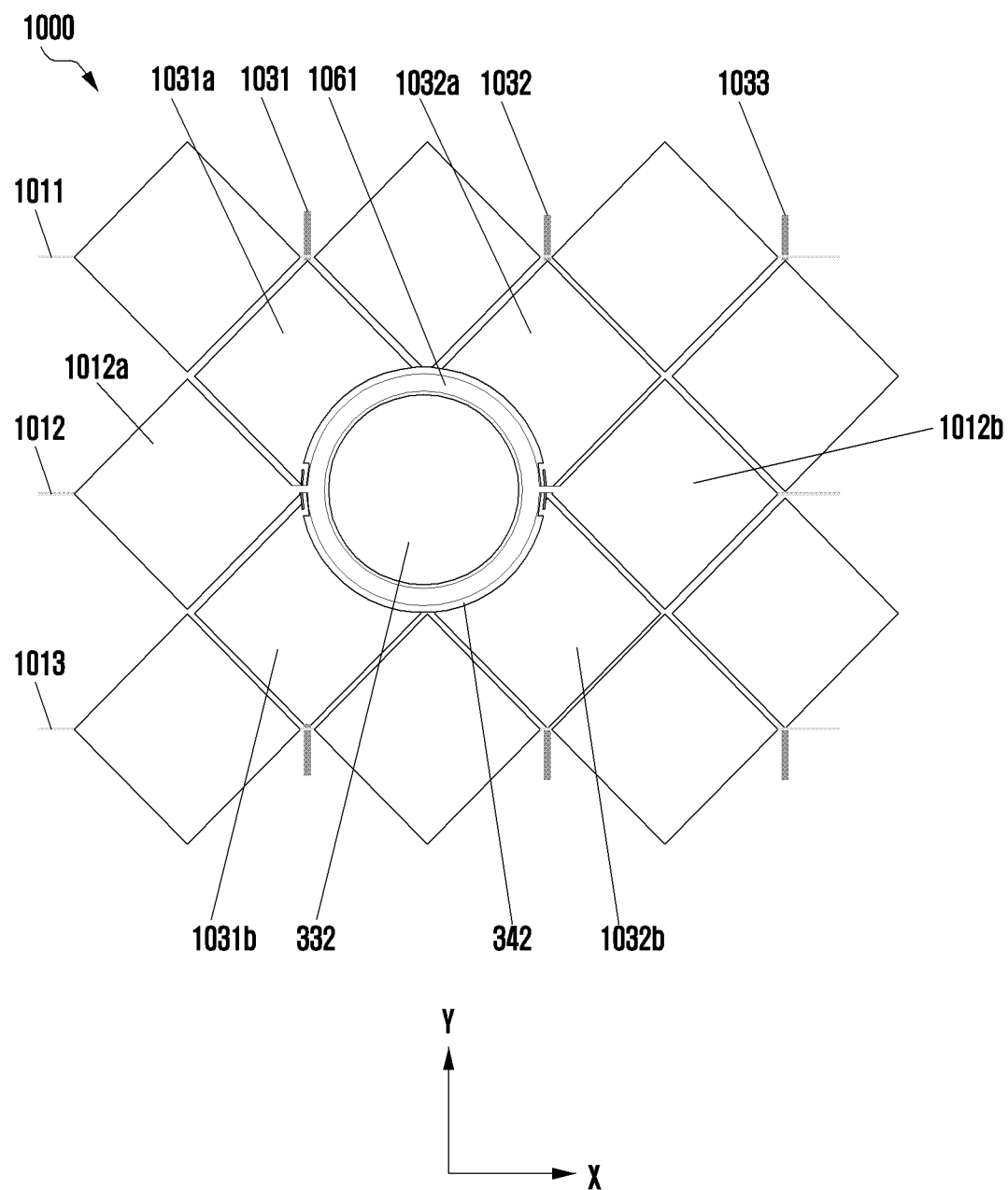
FIG. 10 illustrates a display having a wiring structure for compensating touch sensitivity around an opening according to various embodiments.

FIG. 10 illustrates a display having a wiring structure for compensating touch sensitivity around an opening according to various embodiments. For the convenience of description, elements overlapping those in FIG. 9 will be described briefly, or a description thereof will be omitted. Referring to FIG. 10, in a surrounding part 1000 (e.g. the surrounding part 900 in FIG. 9), a (1-1)th touch line 1011, a (1-2)th touch line 1012, and a (1-3)th touch line 1013 may be arranged in the X-axis direction, and a (2-1)th touch line 1031, a (2-2)th touch line 1032, and a (2-3)th touch line 1033 may be arranged in the Y-axis direction while crossing the (1-1)th touch line 1011, the (1-2)th touch line 1012, and the (1-3)th touch line 1013.

According to various embodiments, a compensation pattern for compensating touch sensitivity around an opening may be formed around the opening. In one embodiment, when the second opening 332 is formed such that the center of the second opening 332 is close to or is substantially aligned with the center of a touch electrode included in the (1-2)th touch line 1012, the touch electrode may be lost, and thus the touch sensitivity around the second opening 332 may be reduced. A first connection wire 1061 is a pattern for minimizing the reduction in the touch sensitivity around the second opening 332, and may be formed around the second opening 332. For example, the first connection wire 1061 is thicker than the first connection wire 961 in FIG. 9, has the shape of a ring surrounding the second opening 332, and may be disposed in the dead space 342 so as to replace at least a part of the lost touch electrode. Further, in the (1-2)th touch line 1012, the first connection wire 1061 may electrically connect a first touch electrode 1012a to a second touch electrode 1012b at the location of the lost touch electrode therebetween.

Figure 11:
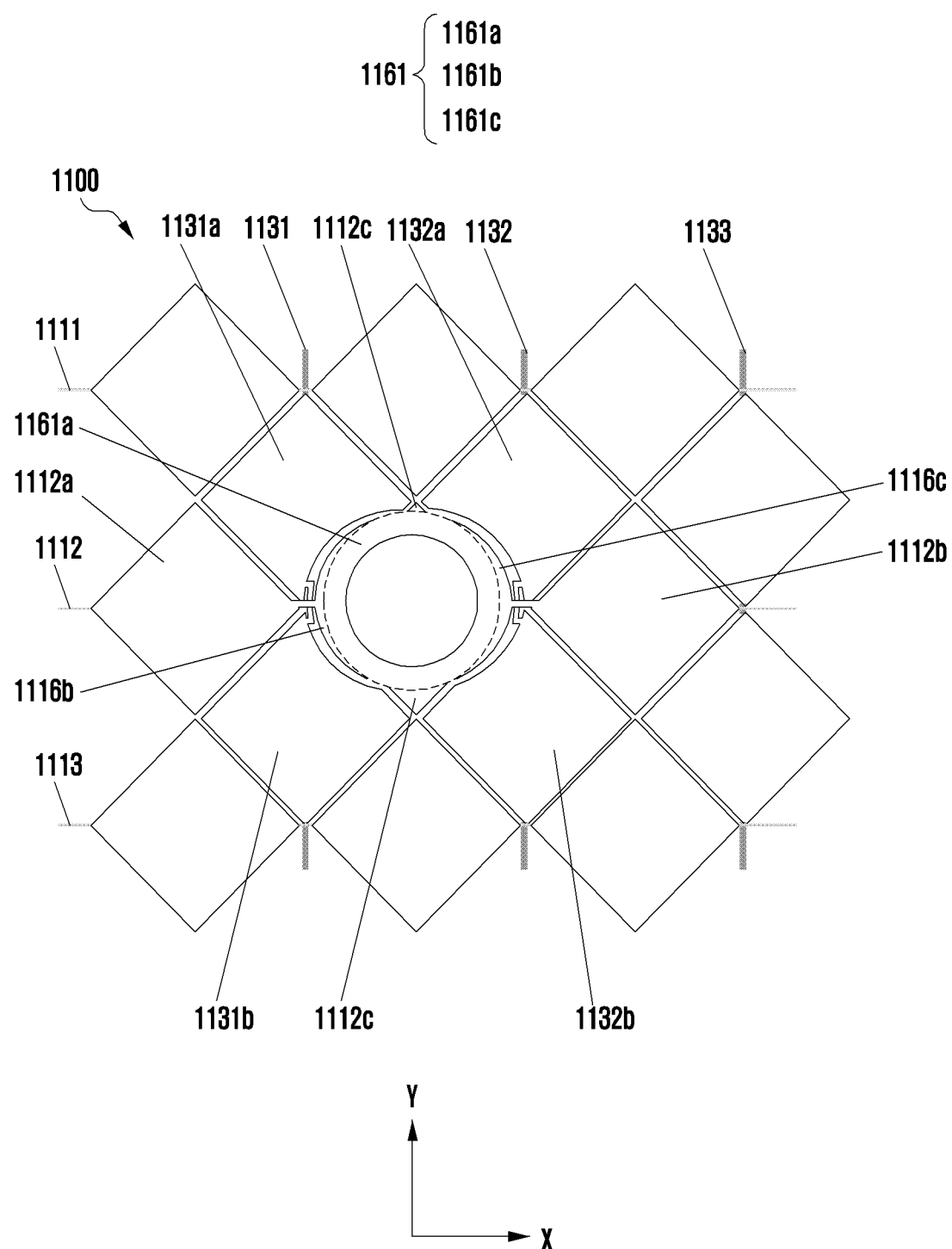
FIG. 11 illustrates a display having a wiring structure for compensating touch sensitivity around an opening according to various embodiments.

FIG. 11 illustrates a display having a wiring structure for compensating touch sensitivity around an opening according to various embodiments. For the convenience of description, elements overlapping those in FIG. 9 will be described briefly, or a description thereof will be omitted. Referring to FIG. 11, in a surrounding part 1100 (e.g. the surrounding part 900 in FIG. 9), a (1-1)th touch line 1111, a (1-2)th touch line 1112, and a (1-3)th touch line 1113 may be arranged in the X-axis direction, and a (2-1)th touch line 1131, a (2-2)th touch line 1132, and a (2-3)th touch line 1133 may be arranged in the Y-axis direction while crossing the (1-1)th touch line 1111, the (1-2)th touch line 1112, and the (1-3)th touch line 1113.

According to various embodiments, a compensation pattern for compensating touch sensitivity around an opening may be formed around the opening. In one embodiment, when the second opening 332 is formed such that the center of the second opening 332 is close to or is substantially aligned with the center of a touch electrode included in the (1-2)th touch line 1112, and when the dead space 342 is formed around the second opening 332, at least a part of the touch electrode may be lost. For example, the remaining part of the touch electrode, except for a part 1112*c* thereof, is lost, and thus, in the (1-2)th touch line 1112, a first touch electrode 1112*a* may be electrically disconnected from a second touch electrode 1112*b* at the location of the lost part therebetween, and the touch sensitivity around the second opening 332 may be reduced. A first connection wire 1161 is a pattern for minimizing the reduction in touch sensitivity around the second opening 332, and may be formed around the second opening 332. For example, the first connection wire 1161 may include: a first part 1161*a*, formed in the dead space 342 and having the shape of a ring surrounding the second opening 332; a second part 1161*b*, electrically connected to the first touch electrode 1112*a* and extending from the first part 1161*a* to be adjacent to a third touch electrode 1131*a* and a fourth touch electrode 1131*b* in the (2-1)th touch line 1131 beyond the dead space 342; and a third part 1161*c*, electrically connected to the second touch electrode 1112*b* and extending from the first part 1161*a* to be adjacent to a fifth touch electrode 1132*a* and a sixth touch electrode 1132*b* in the (2-2)th touch line 1132 beyond the dead space 342.

Figure 12:
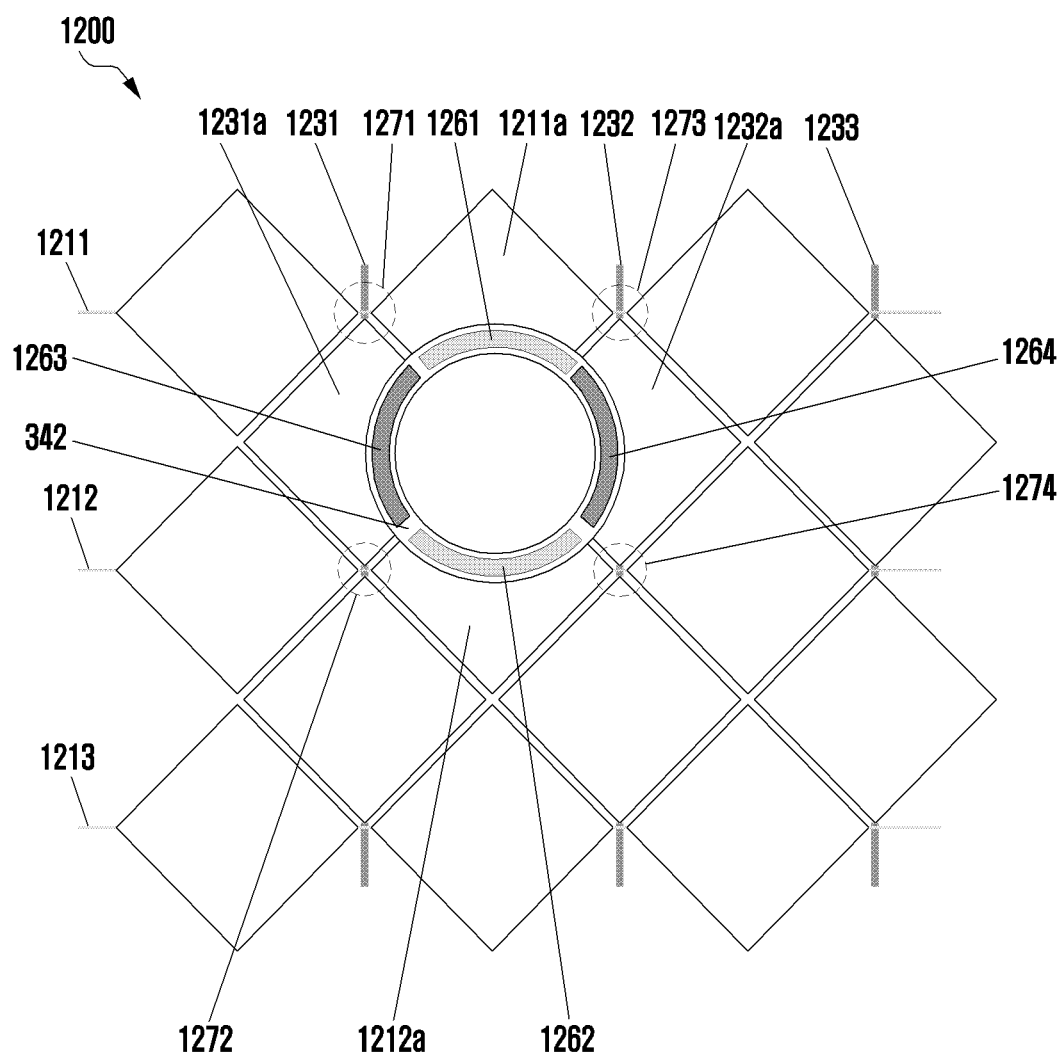
FIG. 12 illustrates a display having a wiring structure for compensating touch sensitivity around an opening according to various embodiments.
Figure 12:
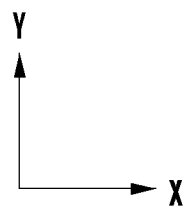

FIG. 12 illustrates a display having a wiring structure for compensating touch sensitivity around an opening according to various embodiments. For the convenience of description, elements overlapping those in FIG. 6 will be described briefly, or a description thereof will be omitted. Referring to FIG. 12, in a surrounding part 1200 (e.g. the surrounding part 600 in FIG. 6), a (1-1)th touch line 1211, a (1-2)th touch line 1212, and a (1-3)th touch line 1213 may be arranged in the X-axis direction, and each of a (2-1)th touch line 1231, a (2-2)th touch line 1232, and a (2-3)th touch line 1233 may be arranged in the Y-axis direction while crossing the (1-1)th touch line 1211, the (1-2)th touch line 1212, and the (1-3)th touch line 1213.

According to one embodiment, when the second opening 332 and the dead space 342 surrounding the same are formed such that a first point 1271, at which the (1-1)th touch line 1211 crosses the (2-1)th touch line 1231, a second point 1272, at which the (1-2)th touch line 1212 crosses the (2-1)th touch line 1231, a third point 1273, at which the (1-1)th touch line 1211 crosses the (2-2)th touch line 1232, and a fourth point 1274, at which the (1-2)th touch line 1212 crosses the (2-2)th touch line 1232, are not lost, Portions of the touch electrodes may be lost and thus touch sensitivity may be reduced, but the touch electrodes may not be electrically disconnected from each other. For example, when the second opening 332 and the dead space 342 are formed, a part of a first touch electrode 1211*a* of the (1-1)th touch line 1211, a part of a second touch electrode 1212*a* of the (1-2)th touch line 1212, a part of a third touch electrode 1231*a* of the (2-1)th touch line 1231, and a part of a fourth touch electrode 1232*a* of the (2-2)th touch line 1232 may be lost. However, even though the second opening 332 and the dead space 342 are formed, the touch electrodes of the (1-1)th touch line 1211 may not be electrically disconnected from each other, the touch electrodes of the (1-2)th touch line 1212 may not be electrically disconnected from each other, the touch electrodes of the (2-1)th touch line 1231 may not be electrically disconnected from each other, and the touch electrodes of the (2-2)th touch line 1232 may not be electrically disconnected from each other.

According to various embodiments, at least one compensation pattern for compensating touch sensitivity around an opening may be formed in a dead space around the opening. According to one embodiment, a first compensation pattern 1261 may be formed in the dead space 342 adjacent to the first touch electrode 1211*a*, a second compensation pattern 1262 may be formed in the dead space 342 adjacent to the second touch electrode 1212*a*, a third compensation pattern 1263 may be formed in the dead space 342 adjacent to the third touch electrode 1231*a*, and a fourth compensation pattern 1264 may be formed in the dead space 342 adjacent to the fourth touch electrode 1232*a*.

According to various embodiments, the electrode nonuse rate of a touch electrode partially lost due to an opening may be configured to be lower than the electrode nonuse rate of another touch electrode which is not lost due to the opening, and thus touch sensitivity around the opening may be compensated. For example, the electrode nonuse rate may signify the ratio of a part per unit area (known as a "dummy") which is not used as an electrode. For example, before being lost, when a first touch electrode and a second touch electrode have the same area and the dummy of the first touch electrode is smaller than the dummy of the second touch electrode, this may indicate that the electrode nonuse rate of the first touch electrode is lower than the electrode nonuse rate of the second touch electrode. The nonuse rate of at least one of touch electrodes partially lost due to an opening (e.g. at least one of the touch electrodes 612*a*, 612*b*, 631*a*, and 631*b* in FIG. 6, at least one of the touch electrodes 712*a*, 712*b*, 731*a*, and 731*b* in FIG. 7A and FIG. 7B, at least one of the touch electrodes 812*a*, 812*b*, 831*a*, and 831*b* in FIG. 8A and FIG. 8B, at least one of the touch electrodes 931*a*, 931*b*, 932*a*, and 932*b* in FIG. 9, at least one of the touch electrodes 1031*a*, 1031*b*, 1032*a*, and 1032*b* in FIG. 10, at least one of the touch electrodes 1131*a*, 1131*b*, 1132*a*, and 1132*b* in FIG. 11, and at least one of the touch electrodes 1211*a*, 1212*a*, 1231*a*, and 1232*a* in FIG. 12) may be configured to be lower than the nonuse rate of other touch electrodes (e.g. unlost touch electrodes).

Figure 13:
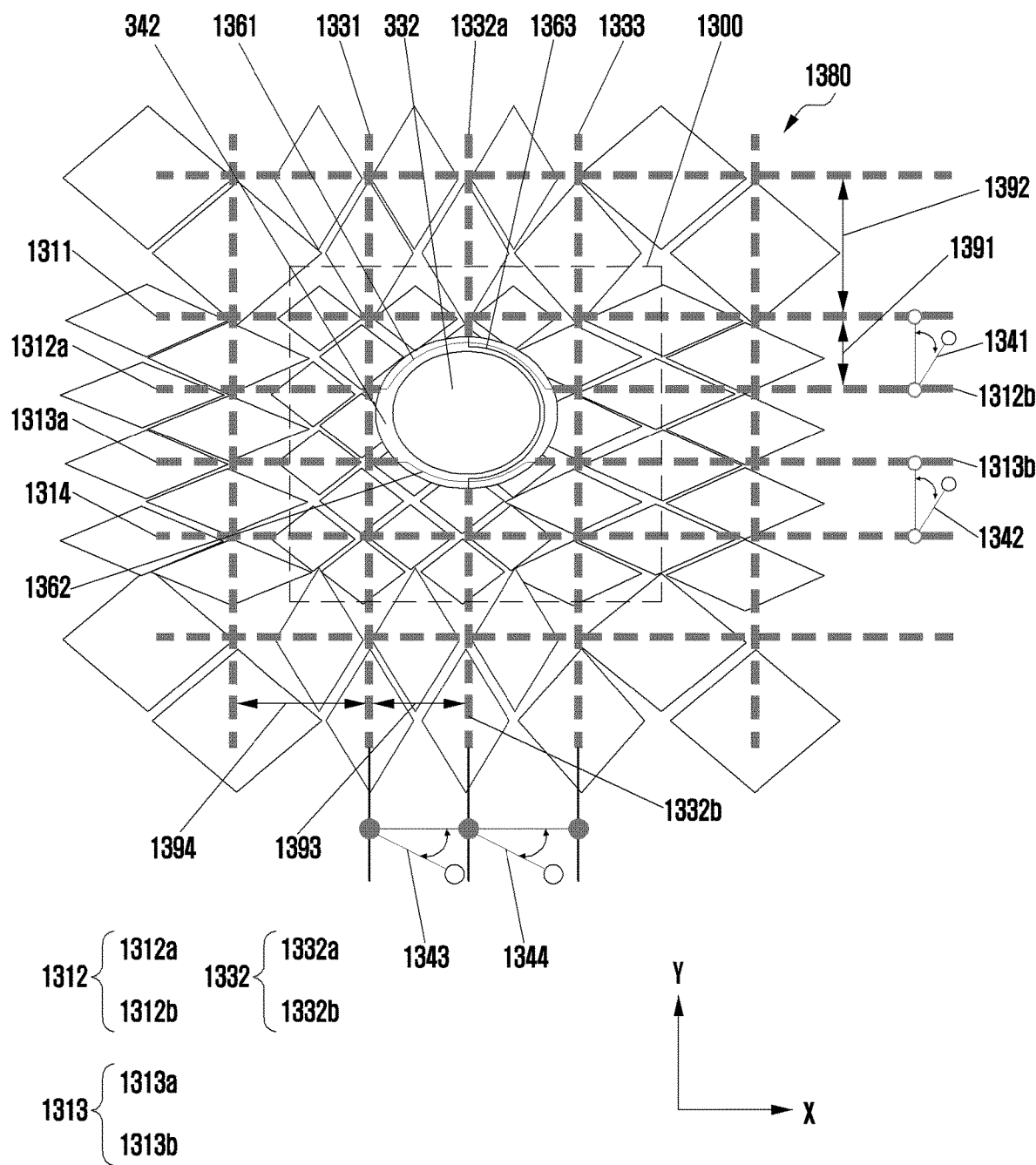
FIG. 13 illustrates a display having a wiring structure for compensating touch sensitivity around an opening according to various embodiments.

FIG. 13 illustrates a display having a wiring structure for compensating touch sensitivity around an opening according to various embodiments. For the convenience of description, elements overlapping those in FIG. 6 will be described briefly, or a description thereof will be omitted. Referring to FIG. 13, in a surrounding part 1300 (e.g. the surrounding part 600 in FIG. 6), a (1-1)th touch line 1311, a (1-2)th touch line 1312, a (1-3)th touch line 1313, and a (1-4)th touch line 1314 may be arranged in the X-axis direction, and a (2-1)th touch line 1331, a (2-2)th touch line 1332, and a (2-3)th touch line 1333 may be arranged in the Y-axis direction while crossing the (1-1)th touch line 1311, the (1-2)th touch line 1312, the (1-3)th touch line 1313, and the (1-4)th touch line 1314. The second opening 332 and the dead space 342 surrounding the same may be formed in the surrounding part 1300. A first part 1312*a* of the (1-2)th touch line 1312 may be electrically connected to a second part 1312*b* thereof via a first connection wire 1361 formed in the dead space 342. A first part 1313*a* of the (1-3)th touch line 1313 may be electrically connected to a second part 1313*b* thereof via a second connection wire 1362 in the dead space 342. Further, a first part 1332*a* of the (2-2)th touch line 1332 may be electrically connected to a second part 1332*b* thereof via a third connection wire 1363 formed in the dead space 342.

According to various embodiments, the touch electrode resolution of a surrounding part (e.g. the surrounding part 1300) may be configured to be higher than the touch electrode resolution outside the surrounding part, and thus the touch sensitivity of the surrounding part, in which an opening is formed, may be compensated. For example, the touch electrode resolution (hereinafter, referred to in brief as "resolution") may refer to the number of touch electrodes per unit area. For example, if a first area is the same size as a second area but the number of touch electrodes positioned in the first area is greater than the number of touch electrodes positioned in the second area, this may signify that the resolution of the first area is higher than the resolution of the second area. According to one embodiment, a pitch 1391 between adjacent touch lines arranged in the X-axis direction while passing through the surrounding part 1300 may be configured to be narrower than a pitch 1392 between adjacent touch lines which are arranged in the X-axis direction and at least one of which does not pass through the surrounding part 1300. A pitch 1393 between adjacent touch lines arranged in the Y-axis direction while passing through the surrounding part 1300 may be configured to be narrower than a pitch 1394 between adjacent touch lines which are arranged in the Y-axis direction and at least one of which does not pass through the surrounding part 1300. Thus, the resolution of the surrounding part 1300 may be configured to be higher than the resolution of a part 1380 outside the surrounding part.

According to various embodiments, a touch sensor IC (e.g. the touch sensor IC 253 in FIG. 2) may compensate touch sensitivity around an opening by controlling a switch for interconnecting adjacent touch lines arranged in the same direction while passing through a surrounding part (e.g. the surrounding part 1300). According to one embodiment, a touch circuit (e.g. the touch circuit 250 in FIG. 2) may include: a first switch 1341 connected between the (1-1)th touch line 1311 and the (1-2)th touch line 1312; a second switch 1342 connected between the (1-3)th touch line 1313 and the (1-4)th touch line 1314; a third switch 1343 connected between the (2-1)th touch line 1331 and the (2-2)th touch line 1332; and a fourth switch 1344 connected between the (2-2)th touch line 1332 and the (2-3)th touch line 1333. The touch sensor IC may electrically connect the (1-1)th touch line 1311 to the (1-2)th touch line 1312 by controlling the first switch 1341 to be closed, and may release the electrical connection between the (1-1)th touch line 1311 and the (1-2)th touch line 1312 by controlling the first switch 1341 to be opened. The touch sensor IC may electrically connect the (1-3)th touch line 1313 to the (1-4)th touch line 1314 by controlling the second switch 1342 to be closed, and may release the electrical connection between the (1-3)th touch line 1313 and the (1-4)th touch line 1314 by controlling the second switch 1342 to be opened. The touch sensor IC may electrically connect the (2-1)th touch line 1331 to the (2-2)th touch line 1332 by controlling the third switch 1343 to be closed, and may release the electrical connection between the (2-1)th touch line 1331 and the (2-2)th touch line 1332 by controlling the third switch 1343 to be opened. The touch sensor IC may electrically connect the (2-2)th touch line 1332 to the (2-3)th touch line 1333 by controlling the fourth switch 1344 to be closed, and may release the electrical connection between the (2-2)th touch line 1332 and the (2-3)th touch line 1333 by controlling the fourth switch 1344 to be opened. The touch sensor IC may recognize the position of user input (e.g. touch input or hovering input). When the recognized position is in the surrounding part 1300, the touch sensor IC may configure at least one of the switches 1341, 1342, 1343, and 1344 to be closed. When the recognized position is outside 1380 the surrounding part 1300, the touch sensor IC may configure the switches 1341, 1342, 1343, and 1344 to be opened.

Figure 14:
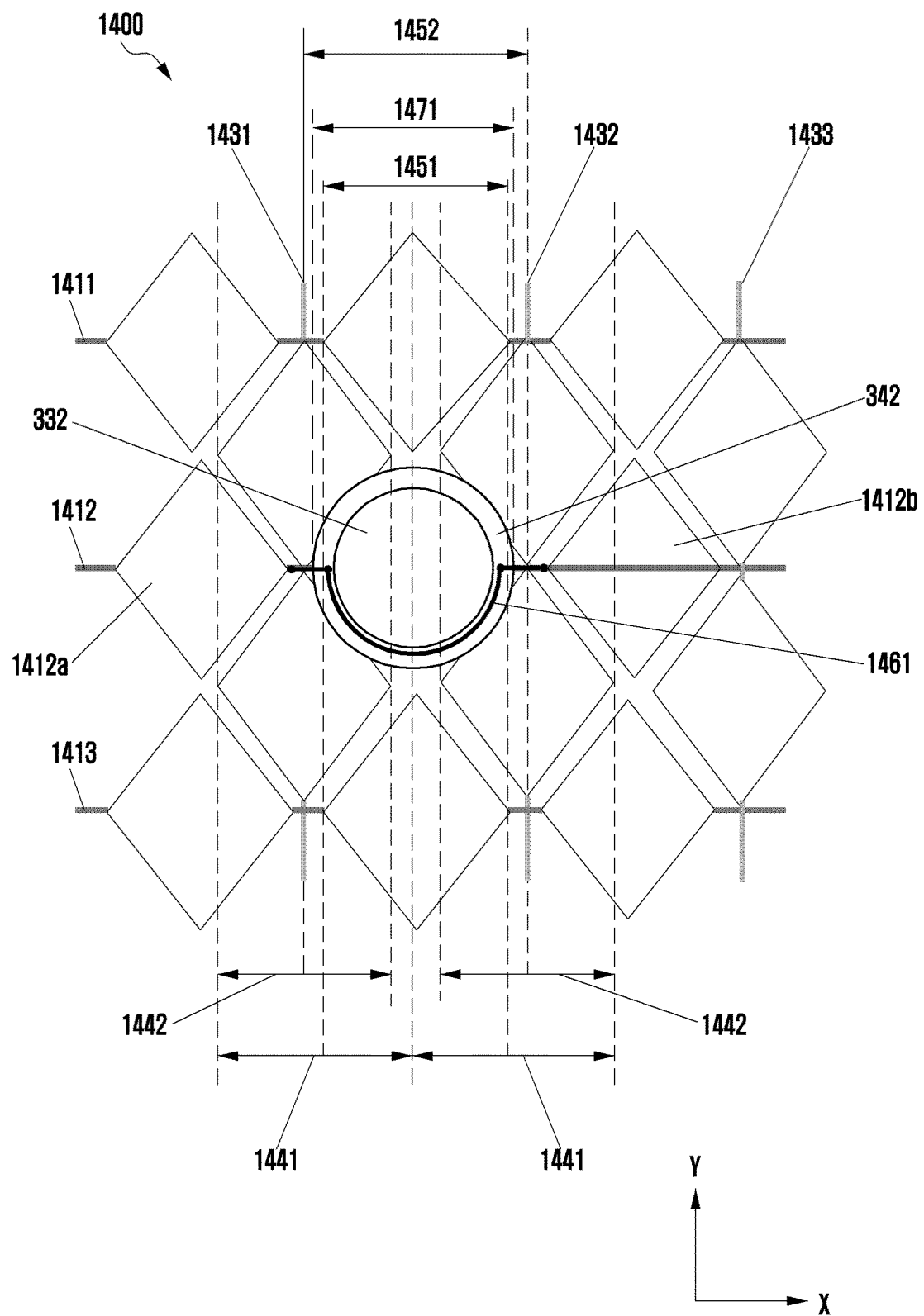
FIG. 14 illustrates a display having a wiring structure for connecting touch electrodes around an opening to each other according to various embodiments.

FIG. 14 illustrates a display having a wiring structure for connecting touch electrodes around an opening to each other according to various embodiments. For the convenience of description, elements overlapping those in FIG. 6 will be described briefly, or a description thereof will be omitted. Referring to FIG. 14, in a surrounding part 1400 (e.g. the surrounding part 600 in FIG. 6), a (1-1)th touch line 1411, a (1-2)th touch line 1412, and a (1-3)th touch line 1413 may be arranged in the X-axis direction, and a (2-1)th touch line 1431, a (2-2)th touch line 1432, and a (2-3)th touch line 1433 may be arranged in the Y-axis direction while crossing the (1-1)th touch line 1411, the (1-2)th touch line 1412, and the (1-3)th touch line 1413. When the second opening 332 and the dead space 342 surrounding the same are formed such that the center of the second opening 332 is close to or is substantially aligned with the center of a touch electrode included in the (1-2)th touch line 1412, the touch electrode may be lost. Thus, in the (1-2)th touch line 1412, a first touch electrode 1412*a* and a second touch electrode 1412*b* are electrically disconnected from each other at the location of the lost touch electrode therebetween. The first touch electrode 1412*a* may be electrically connected to the second touch electrode 1412*b* via a connection wire 1461 formed in the dead space 342.

According to various embodiments, touch electrodes may be arranged so as not to be electrically disconnected from each other by an opening. According to one embodiment, when the pitch between the (2-1)th touch line 1431 and the (2-2)th touch line 1432, which are adjacent to each other, is wider than the width of the dead space 342 in the same direction, each of the (2-1)th touch line 1431 and the (2-2)th touch line 1432 may be disposed in the surrounding part 1400, with no part electrically interrupted by the second opening 332 and the dead space 342. According to one embodiment, when the width of touch electrodes included in the (2-1)th touch line 1431 is configured to become narrow from a first width 1441 to a second width 1442 and the width of touch electrodes included in the (2-2)th touch line 1432 is configured to become narrow from the first width 1441 to the second width 1442, the pitch between the (2-1)th touch line 1431 and the (2-2)th touch line 1432 may be configured to become wide from a first pitch 1451 to a second pitch 1452, and the second pitch 1452 may be wider than the width 1471 of the dead space 342.

Figure 15:
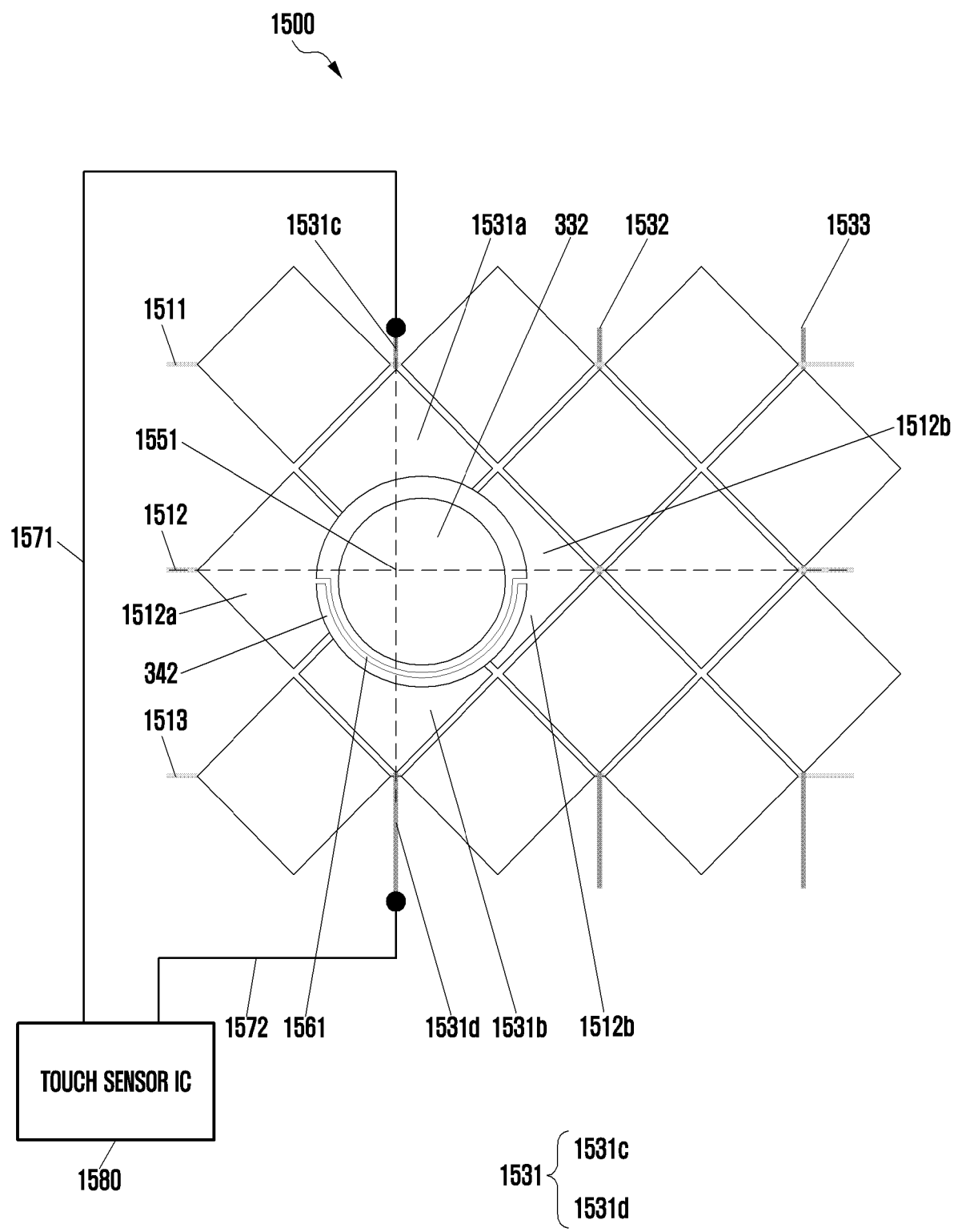
FIG. 15 illustrates a display having a wiring structure for connecting touch electrodes around an opening to a touch sensor IC according to various embodiments.

FIG. 15 illustrates a display having a wiring structure for connecting touch electrodes around an opening to a touch sensor IC according to various embodiments. For the convenience of description, elements overlapping those in FIG. 6 will be described briefly, or a description thereof will be omitted. Referring to FIG. 15, in a surrounding part 1500 (e.g. the surrounding part 600 in FIG. 6), a (1-1)th touch line 1511, a (1-2)th touch line 1512, and a (1-3)th touch line 1513 may be arranged in the X-axis direction, and a (2-1)th touch line 1531, a (2-2)th touch line 1532, and a (2-3)th touch line 1533 may be arranged in the Y-axis direction while crossing the (1-1)th touch line 1511, the (1-2)th touch line 1512, and the (1-3)th touch line 1513. The second opening 332 and the dead space 342 surrounding the same may be formed at a point 1551 at which the (1-2)th touch line 1512 crosses the (2-1)th touch line 1531. Thus, in the (1-2)th touch line 1512 including a first touch electrode 1512*a* and a second touch electrode 1512b, a part of the first touch electrode 1512a and a part of the second touch electrode 1512b are lost due to the second opening 332 and the dead space 342. Therefore, the first touch electrode 1512a and the second touch electrode 1512b are electrically disconnected from each other. In the (2-1)th touch line 1531 including a third touch electrode 1531a and a fourth touch electrode 1531b, a part of the third touch electrode 1531a and a part of the fourth touch electrode 1531b may be lost due to the second opening 332 and the dead space 342, and thus the third touch electrode 1531a and the fourth touch electrode 1531b may be electrically disconnected from each other. The first touch electrode 1512a may be electrically connected to the second touch electrode 1512b via a connection wire 1561 formed in the dead space 342.

According to various embodiments, a wire for electrically connecting two parts of a touch line (e.g. the (2-1)th touch line 1531), cut and bisected by an opening (e.g. the second opening 332), to a touch sensor IC (e.g. the touch sensor IC 253 in FIG. 2) may be formed in a display (e.g. the display 310 in FIG. 3). According to one embodiment, a first wire 1571 and a second wire 1572 may be formed in a non-display region (e.g. the non-display region 312 in FIG. 3). The first wire 1571 may electrically connect a first part 1531a of the (2-1)th touch line 1531 to a touch sensor IC 1580, and the second wire 1572 may electrically connect a second part 1531b of the (2-1)th touch line 1531 to the touch sensor IC 1580.

According to various embodiments, a driving channel may be allocated to each of two parts of a touch line (e.g. the (2-1)th touch line 1531) cut and bisected by an opening (e.g. the second opening 332), and thus a signal (e.g. a scan signal) may be sequentially output to the two parts. For example, the touch sensor IC 1580 may sequentially output a signal (e.g. a scan signal) to the first part 1531a of the (2-1)th touch line 1531, the second part 1531b of the (2-1)th touch line 1531, the (2-2)th touch line 1532, and the (2-3)th touch line 1533. The touch sensor IC 1580 may sense a touch input or hovering input to a particular position in the surrounding part 1500 by measuring a change (e.g. capacitance) of the signal through the (1-1)th touch line 1511, the (1-2)th touch line 1512, and the (1-3)th touch line 1513.

Figure 16:
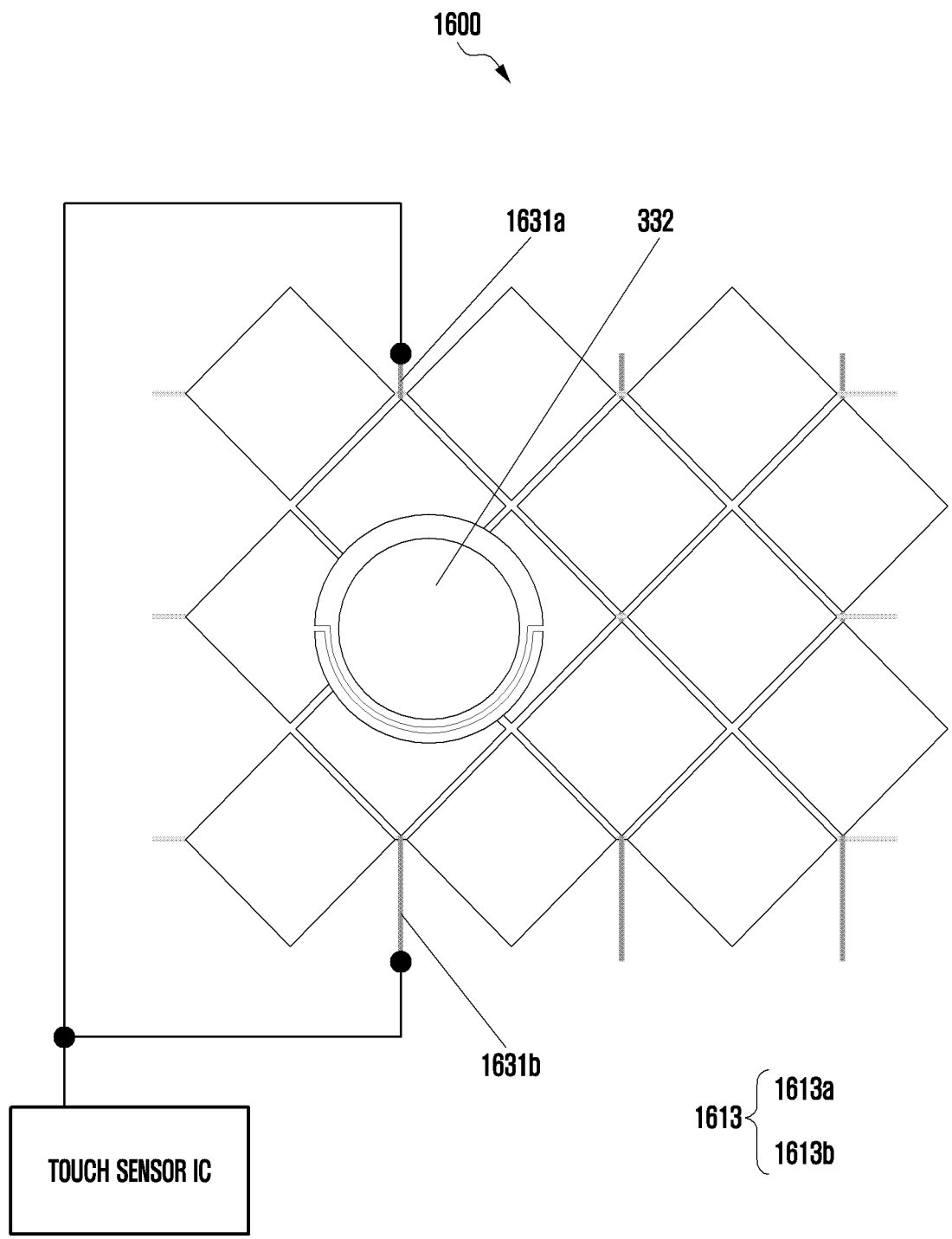
FIG. 16 illustrates a display having a wiring structure for connecting touch electrodes around an opening to a touch sensor IC according to various embodiments.

FIG. 16 illustrates a display having a wiring structure for connecting touch electrodes around an opening to a touch sensor IC according to various embodiments. For the convenience of description, a description of elements overlapping those in FIG. 15 will be omitted. Referring to FIG. 16, the same driving channel may be allocated to two parts 1631a and 1631b (e.g. the first part 1531a and the second part 1531b in FIG. 15) of a touch line 1631 (e.g. the (2-1)th touch line 1531 in FIG. 15) cut and bisected by the second opening 332, and thus a signal (e.g. a scan signal) may be simultaneously output to the two parts 1631a and 1631b.

According to various embodiments of the disclosure, an electronic device (e.g. the electronic device 300 in FIG. 3) may include a touch layer in which a sensor (e.g. the second sensor 322 in FIG. 3) is capable of being disposed under a designated region (e.g. the surrounding part 600 in FIG. 6) thereof, wherein the touch layer may include: a first touch line (e.g. the (1-2)th touch line 612 in FIG. 6) including a first touch electrode (e.g. the first touch electrode 612a) and a second touch electrode (e.g. the second touch electrode 612b) arranged in a first direction in the designated region; a second touch line (e.g. the (2-1)th touch line 631 in FIG. 6) including a third touch electrode (e.g. the third touch electrode 631a in FIG. 6) and a fourth touch electrode (fourth touch electrode 631b in FIG. 6) arranged in a second direction in the designated region while crossing the first touch line; a first opening (e.g. the second opening 332 in FIG. 6) formed in a region in which the first touch line crosses the second touch line; and a first connection wire (e.g. the first connection wire 661 in FIG. 6) provided in a surrounding part around the first opening and configured to connect the first touch electrode to the second touch electrode.

According to various embodiments, the electronic device may include a second connection wire (e.g. the second connection wire 662 in FIG. 6) provided in the surrounding part around the first opening and configured to connect the third touch electrode to the fourth touch electrode.

According to various embodiments, the electronic device may further include a display panel layer, wherein the display panel layer may have a second opening formed in the designated region and may include a non-active region (e.g. the dead space 342 in FIG. 6) formed in a surrounding part around the second opening.

According to various embodiments, the second opening is formed to be at least partially aligned with the first opening when seen from above the touch layer.

According to various embodiments, the first connection wire may include at least one of a metal or a metal mesh.

According to various embodiments, the electronic device may further include a compensation pattern (e.g. the first connection wire 761 and/or the second connection wire 762 in FIG. 7A), wherein the compensation pattern may be disposed in the surrounding part of the first opening and extend from the first connection wire, thereby compensating touch sensitivity around the opening. The designated region may include: a display region; and a non-active region surrounding the first opening, wherein at least a part of the compensation pattern may be formed in the non-active region.

According to various embodiments, a part (e.g. the second part 861b, the second part 862b, the second part 863b, or the second part 864b in FIG. 8A and FIG. 8B) of the compensation pattern may extend up to the display region.

According to various embodiments, the first connection wire may include: a (1-1)th connection wire (e.g. the first connection wire 661 in FIG. 6) configured to connect a first point of the first touch electrode to a first point of the second touch electrode; and a (1-2)th connection wire (e.g. the third connection wire 663) configured to connect a second point of the first touch electrode to a second point of the second touch electrode.

According to various embodiments, the first touch line may include multiple touch lines (e.g. the (1-1)th touch line 1313, the (1-2)th touch line 1312, the (1-3)th touch line 1313, and the (1-4)th touch line 1314 in FIG. 13) arranged in the designated region, wherein a pitch (e.g. the pitch 1391 in FIG. 13) between adjacent touch lines arranged in the first direction in the designated region may be configured to be narrower than a pitch (e.g. the pitch 1392 in FIG. 13) between adjacent touch lines arranged in the first direction outside the designated region.

According to various embodiments, the electronic device may further include: a switch (e.g. the first switch 1341 and/or the second switch 1342 in FIG. 13) configured to interconnect the adjacent touch lines arranged in the first direction in the designated region; and a touch sensor IC configured to control the switch, wherein the touch sensor IC (e.g. the touch sensor IC 253 in FIG. 2) may close the switch when user input is sensed in the designated region, and may open the switch when user input is sensed outside the designated region.

According to various embodiments, the second touch line (e.g. the (2-1)th touch line 1531 in FIG. 15) may include a first part and a second part, electrically isolated from each other, and the electronic device may include: a second connection wire (e.g. the first wire 1571 in FIG. 15) electrically connected to the first part; a third connection wire electrically connected to the second part; and a touch sensor IC (e.g. the touch sensor IC 1580 in FIG. 15) configured to output a signal to the first part via the second connection wire and to output a signal to the second part via the third connection wire (e.g. the second wire 1572 in FIG. 15). The second connection wire may be formed outside the designated region. The touch sensor IC may output a signal to the first part and the second part either simultaneously (e.g. the method of FIG. 16) or sequentially (e.g. the method of FIG. 15).

According to various embodiments, an electronic device may include a display in which a sensor is capable of being disposed under a designated region thereof. The display may include: a display panel layer, having a first opening formed in the designated region and including a non-active region formed in a surrounding part around the first opening; and a touch layer, which includes a first touch line, including a first touch electrode and a second touch electrode, arranged in a first direction in the designated region, a second touch line, including a third touch electrode and a fourth touch electrode, arranged in a second direction in the designated region while crossing the first touch line, a second opening formed in a region in which the first touch line crosses the second touch line, and a connection wire configured to connect the first touch electrode to the second touch electrode, wherein the connection wire may be formed in a region around the second opening so as to be aligned with the non-active region.

According to various embodiments, an electronic device may include: a touch layer; and a sensor disposed under a designated region of the touch layer, wherein the touch layer may include: a first touch line arranged in a first direction and including a first touch electrode and a second touch electrode positioned in the designated region; a second touch line arranged in a second direction crossing the first direction and including a third touch electrode and a fourth touch electrode positioned in the designated region; an opening formed in the designated region and parallel to the sensor when seen from above the touch layer; and a compensation pattern (e.g. at least one among the compensation patterns 1261, 1262, 1263, and 1264 in FIG. 12) formed around the opening so as to compensate the touch sensitivity of at least one among the first touch electrode, the second touch electrode, the third touch electrode, and the fourth touch electrode.

According to various embodiments, the designated region may include: a display region; and a non-active region which surrounds the first opening and is not used as a display region, wherein at least a part of the compensation pattern may be formed in the non-active region (e.g. the dead space 342 in FIG. 12). The compensation pattern may include a metal and/or a metal mesh.

According to various embodiments, an electronic device may include: a touch layer; and a sensor disposed under a designated region of the touch layer, wherein the touch layer may include: a first touch line arranged in a first direction and including a first touch electrode and a second touch electrode positioned in the designated region; a second touch line arranged in a second direction crossing the first direction and including a third touch electrode and a fourth touch electrode positioned in the designated region; and an opening formed in the designated region and parallel to the sensor when seen from above the touch layer, wherein at least one among the first touch electrode, the second touch electrode, the third touch electrode, and the fourth touch electrode, which are positioned in the designated region, may have a smaller part per unit area (known as a "dummy"), which is not used as an electrode, than a touch electrode positioned outside the designated region.

According to various embodiments, the at least one among the first touch electrode, the second touch electrode, the third touch electrode, and the fourth touch electrode may have a smaller area than the touch electrode positioned outside the designated region.

The embodiments of the disclosure disclosed in the specification and the drawings are only particular examples for easily describing the technical matters of the disclosure and helping understanding of the disclosure, and do not limit the scope of the scope of embodiments of the disclosure. Therefore, it should be construed that all modifications or modified forms capable of being derived from the technical idea of the disclosure in addition to the various embodiments disclosed herein are included in the scope of various embodiments of the disclosure.

What is claimed is:

1. A portable communication device comprising:
    a touchscreen display including a touch sensing layer having an opening formed therein; and
    a sensor disposed as at least partially aligned with the opening;
    wherein the touch sensing layer includes:
        a first touch electrode disposed at a first side with respect to the opening,
        a second touch electrode disposed at a second side different from the first side with respect to the opening, and
        a connection line including a first part having a first width and a second part extended from the first part and having a second width wider than the first width, the connection line connecting the first touch electrode and the second touch electrode along at least a part of a boundary of the opening, and
    wherein each of the first part and the second part is formed in a curved shape.

2. The portable communication device of claim 1, wherein the first touch electrode and the second touch electrode are formed as at least part of a metal mesh forming the touch sensing layer.

3. The portable communication device of claim 1, wherein the boundary of the opening is formed as substantially corresponding to the curved shape.

4. The portable communication device of claim 1, wherein the first touch electrode and the second touch electrode are formed in a same direction, and the connection line connects the first touch electrode and the second touch electrode in the same direction.

5. The portable communication device of claim 1,
    wherein the touchscreen display includes a printed region surrounding the opening, and
    wherein the first part and the second part are disposed in the printed region.

6. The portable communication device of claim 5, wherein the printed region has a round shape.

7. The portable communication device of claim 1, wherein the second part having the second width wider than the first width of the first part is composed of a same conductive material as that of the first touch electrode and the second touch electrode.

8. The portable communication device of claim 1, wherein the connection line includes a third part elongated from the connection line along at least a part of the boundary of the opening.

9. The portable communication device of claim 1, wherein the first width of the first part or the second width of the second part is configured such that a touch input signal with respect to a region at least partially surrounding the opening is to be compensated by the second part having the second width.

10. The portable communication device of claim 1,
wherein the touchscreen display includes a display panel, and
wherein the touch sensing layer is integrated in the display panel.

11. The portable communication device of claim 1, wherein the sensor comprises a camera, an illuminance sensor, a proximity sensor or a fingerprint sensor.

\* \* \* \* \*